(12) United States Patent
Kondo et al.

(10) Patent No.: US 10,180,376 B2
(45) Date of Patent: Jan. 15, 2019

(54) BALL BEARING INSPECTION DEVICE AND INSPECTION METHOD

(71) Applicant: NSK LTD., Tokyo (JP)

(72) Inventors: Daisuke Kondo, Fujisawa (JP); Taito Shibuya, Fukuroi (JP); Kentarou Kachi, Fujisawa (JP); Katsuyuki Kawamura, Fujisawa (JP); Shinichi Takamura, Fujisawa (JP)

(73) Assignee: NSK LTD., Tokyo (JP)

( * ) Notice: Subject to any disclaimer, the term of this patent is extended or adjusted under 35 U.S.C. 154(b) by 138 days.

(21) Appl. No.: 15/312,278

(22) PCT Filed: May 20, 2015

(86) PCT No.: PCT/JP2015/064541
§ 371 (c)(1),
(2) Date: Nov. 18, 2016

(87) PCT Pub. No.: WO2015/178435
PCT Pub. Date: Nov. 26, 2015

(65) Prior Publication Data
US 2017/0089807 A1    Mar. 30, 2017

(30) Foreign Application Priority Data

May 20, 2014 (JP) .................................. 2014-104335
Mar. 30, 2015 (JP) .................................. 2015-069845

(51) Int. Cl.
*G01M 13/04* (2006.01)
*F16C 19/06* (2006.01)
(Continued)

(52) U.S. Cl.
CPC ........... *G01M 13/045* (2013.01); *F16C 19/06* (2013.01); *F16C 19/52* (2013.01); *F16C 19/527* (2013.01); *G01M 13/04* (2013.01)

(58) Field of Classification Search
CPC ....... G01M 13/04; G01M 13/045; F16C 19/06; F16C 19/14; F16C 19/16; F16C 19/00;
(Continued)

(56) References Cited

U.S. PATENT DOCUMENTS

| 5,495,764 | A | * | 3/1996 | Matsuzaki | .......... | G01M 13/045 |
| | | | | | | 73/593 |
| 5,889,218 | A | * | 3/1999 | Sato | ...................... | G01M 13/04 |
| | | | | | | 73/593 |
| 6,293,151 | B1 | * | 9/2001 | Kawamata | .......... | G01M 13/045 |
| | | | | | | 73/593 |

FOREIGN PATENT DOCUMENTS

| JP | S 47-9903 Y1 | 4/1972 |
| JP | S 47-9904 Y1 | 4/1972 |
(Continued)

OTHER PUBLICATIONS

Search Report dated Aug. 11, 2015, issued by the International Searching Authority in counterpart International Application No. PCT/JP2015/064541 (PCT/ISA/210).
(Continued)

*Primary Examiner* — Lisa M Caputo
*Assistant Examiner* — Suman K Nath
(74) *Attorney, Agent, or Firm* — Sughrue Mion, PLLC

(57) ABSTRACT

A ball bearing inspection device includes: an arbor supporting an inner ring on the outer circumferential surface; a rotary drive unit driving the arbor; a first pressing unit applying a preload to a ball bearing; a second pressing unit applying a preload in an opposite direction of the pressing direction; and a vibration detection unit detecting vibration from the ball bearing. The arbor includes an abutting section that protrudes outward from the outer circumferential surface, a movable flange arranged apart from the abutting section, and a flange drive mechanism switching the movable flange between a first state in which the movable flange
(Continued)

protrudes from the outer circumferential surface and a second state in which the movable flange is accommodated within the arbor. The flange drive mechanism is additionally provided with a drive force supply unit that applies drive force for switching to the first or the second state.

9 Claims, 34 Drawing Sheets

(51) Int. Cl.
*F16C 19/52* (2006.01)
*F16C 19/14* (2006.01)
*F16C 19/16* (2006.01)
*G01N 29/14* (2006.01)

(58) Field of Classification Search
CPC .................. F16C 19/527; G01N 29/14; G01N 2291/2696; G01H 17/00; G01H 1/003

USPC ........................................... 73/593, 587, 660
See application file for complete search history.

(56) References Cited

FOREIGN PATENT DOCUMENTS

| JP | H 2-208553 A | 8/1990 |
| JP | H 10-253501 A | 9/1998 |
| JP | 2000-292314 A | 10/2000 |
| JP | 2010175511 A | 8/2010 |

OTHER PUBLICATIONS

Written Opinion dated Aug. 11, 2015, issued by the International Searching Authority in counterpart International Application No. PCT/JP2015/064541 (PCT/ISA/220 & 237).

* cited by examiner

BALL BEARING INSPECTION DEVICE AND INSPECTION METHOD

TECHNICAL FIELD

The present invention relates to a ball bearing inspection device and an inspection method.

BACKGROUND ART

In general, during a manufacturing process of a ball bearing, it is inspected whether a ball surface of a bearing single body has a flaw and whether or not a foreign matter and a processing defect, so as to comprehensively determine whether a quality of a completed ball bearing is good or bad. In the inspection process, an inner ring of a ball bearing to be inspected is fitted to a rotary shaft, and the inner ring is rotated by the rotary shaft with an outer ring being applied with a preload. Then, vibration that is generated from the ball bearing as the inner ring and the outer ring rotate relative to each other is measured and it is determined whether a quality of the ball bearing to be inspected is good or bad on the basis of a result of the vibration measurement. As a ball bearing inspection device that is to be used in the inspection process, inspection devices disclosed in Patent Documents 1 and 2 have been known, for example.

RELATED ART REFERENCE

Patent Document

Patent Document 1: JP-A-H10-253501
Patent Document 2: JP-A-2000-292314

SUMMARY OF THE INVENTION

Problems to be Solved by the Invention

The ball bearing inspection device disclosed in Patent Document 1 has two rotary shafts and a mechanism provided between the two rotary shafts and configured to reverse a ball bearing by 180°. For this reason, it is possible to continuously perform operations of applying a preload from one surface-side of the ball bearing for inspection while rotationally driving the ball bearing with one rotary shaft, rotating the ball bearing by 180° after the inspection and applying a preload from the other surface-side of the ball bearing for inspection while rotationally driving the ball bearing with the other rotary shaft. However, according to this method, the reversal mechanism and the high-priced spindle should be biaxially provided, which increases the facility cost.

In the meantime, according to the ball bearing inspection device disclosed in Patent Document 2, a mechanism configured to push back an outer ring of the bearing in an opposite direction to a preload direction is mounted. In a general vibration measurement device, a raceway surface that is to contact by the preload is determined but the outer ring of the bearing is slightly pushed back by the push back mechanism, so that a contact surface is enlarged. Thereby, it is possible to find a defect over a wider surface. However, when pushing back the outer ring of the bearing, it is not possible to apply the large preload to the outer ring. For this reason, while it is possible to measure the vibration when the preload is applied from one surface-side of the ball beating, it is difficult to sufficiently measure the vibration when the preload is applied from the other surface-side.

The reason is that the inspection device does not have a structure configured to axially restrain the inner ring. Also, it is necessary to axially apply the preload of about 50 to 400N upon the vibration measurement although it is different depending on a size of the ball bearing. When the load is applied, it is not possible to prevent axial displacement of the inner ring only by a frictional force between the rotary shaft and the inner ring. As a result, when the preload is insufficient, an inner-diameter surface of the inner ring and the rotary shaft slide, so that the inner ring runs idle or the outer ring rotates together with the inner ring. As a result, it is difficult to correctly measure the vibration.

It is therefore an object of the present invention to provide a ball bearing inspection device and an inspection method, in which a reversal mechanism of a ball bearing is not required when measuring vibration at the other surface-side of the ball bearing after completing vibration measurement at one surface-side of the ball bearing and a rotary shaft is configured only by one shaft, which saves the facility cost.

Means for Solving the Problems

The present invention is configured as follows.

(1) A ball bearing inspection device configured to detect vibration to be generated from a ball bearing by relatively rotating an outer ring and an inner ring of the ball bearing, the ball bearing inspection device including:

an arbor configured to support the inner ring of the ball bearing on an outer circumferential surface thereof;

a rotary drive unit configured to rotationally drive the arbor;

a first pressing unit configured to apply a preload to the ball bearing by pressing the outer ring of the ball bearing supported on the arbor in an axial direction;

a second pressing unit configured to apply a preload to the ball hearing by pressing the outer ring in an opposite direction to the pressing direction of the first pressing unit; and a vibration detection unit configured to detect the vibration from the ball bearing, wherein:

the arbor includes:
an abutting part protruding radially outward from the outer circumferential surface;
at least one moveable flange arranged apart from the abutting part at least by a width of the inner ring; and
a flange drive mechanism configured to switch the moveable flange between a first state where the moveable flange protrudes from the outer circumferential surface and a second state where the e moveable flange is accommodated in the arbor; and the ball bearing inspection device further includes a drive force supply unit configured to apply a drive force for switching the flange drive mechanism to the first state or the second state.

(2) The ball bearing inspection device of the above (1), wherein:

the flange drive mechanism includes a piston unit supported to be freely moveable in the axial direction in the arbor;

at least one of the piston unit and the moveable flange has an inclined surface inclined relative to the axial direction; and the piston unit and the moveable flange are configured to slide each other on the inclined surface, so that axial movement of the piston unit is converted into radial movement of the moveable flange.

(3) The ball bearing inspection device of the above (1) or (2), further including a loading unit configured to supply the ball bearing to the arbor, wherein the drive force supply unit is mounted to the loading unit.

(4) The ball bearing inspection device of one of the above (1) to (3), further including a calculation unit configured to calculate an evaluation value for evaluating the ball bearing, based on a vibration detection result by the vibration detection unit.

(5) The ball bearing inspection device of one of the above (1) to (4), wherein:

the arbor includes:
an arbor main body having the abutting part formed thereto; and
a cover member attached to one end portion of a ball bearing insertion-side of the arbor main body; and the moveable flange is a flat plate-shaped member arranged between a main body-side plane part formed at the one end portion of the arbor main body and a cover member-side plane part formed in parallel with the main body-side plane part with facing the main body-side plane part of the cover member.

(6) The ball bearing inspection device of the above (5), wherein a spacer member having a thickness larger than a plate thickness of the moveable flange is arranged between the main body-side plane part and the cover member-side plane part.

(7) The ball bearing inspection device of the above (5) or (6), wherein:

the moveable flange has a pair of guide holes parallel with each other formed along the radial direction; and at least one of the arbor main body and the cover member has a pair of guide pins to be fitted to the guide holes.

(8) A ball bearing inspection method using the ball bearing inspection device of one of the above (1) to (7), the method including:

inserting an inner ring of a ball bearing to be inspected into the arbor at the second state of the moveable flange and supporting the ball bearing at a position at which the inner ring is contacted to the abutting part;

protruding the moveable flange from the outer circumferential surface by the flange drive mechanism;

detecting vibration of the ball bearing by applying a preload to the ball bearing by one of the first pressing unit and the second pressing unit at a state where the inner ring is rotationally driven; and detecting vibration of the ball bearing by applying a preload to the ball bearing by the other of the first pressing unit and the second pressing unit at the state where the inner ring is rotationally driven.

(9) The ball bearing inspection method of the above (8), further including a process of calculating an evaluation value for evaluating the ball bearing on the basis of a vibration detection result of the ball bearing.

Advantages of the Invention

According to the present invention, it is not necessary to provide a reversal mechanism of the ball bearing when measuring vibration at the other surface-side of the ball bearing after completing vibration measurement at one surface-side of the ball bearing and it is possible to configure a rotary shaft only by one shaft and to thus save the facility cost.

MODES FOR CARRYING OUT THE INVENTION

Hereinafter, an illustrative embodiment of the present invention will be described in detail with reference to the drawings.

Figure 1:
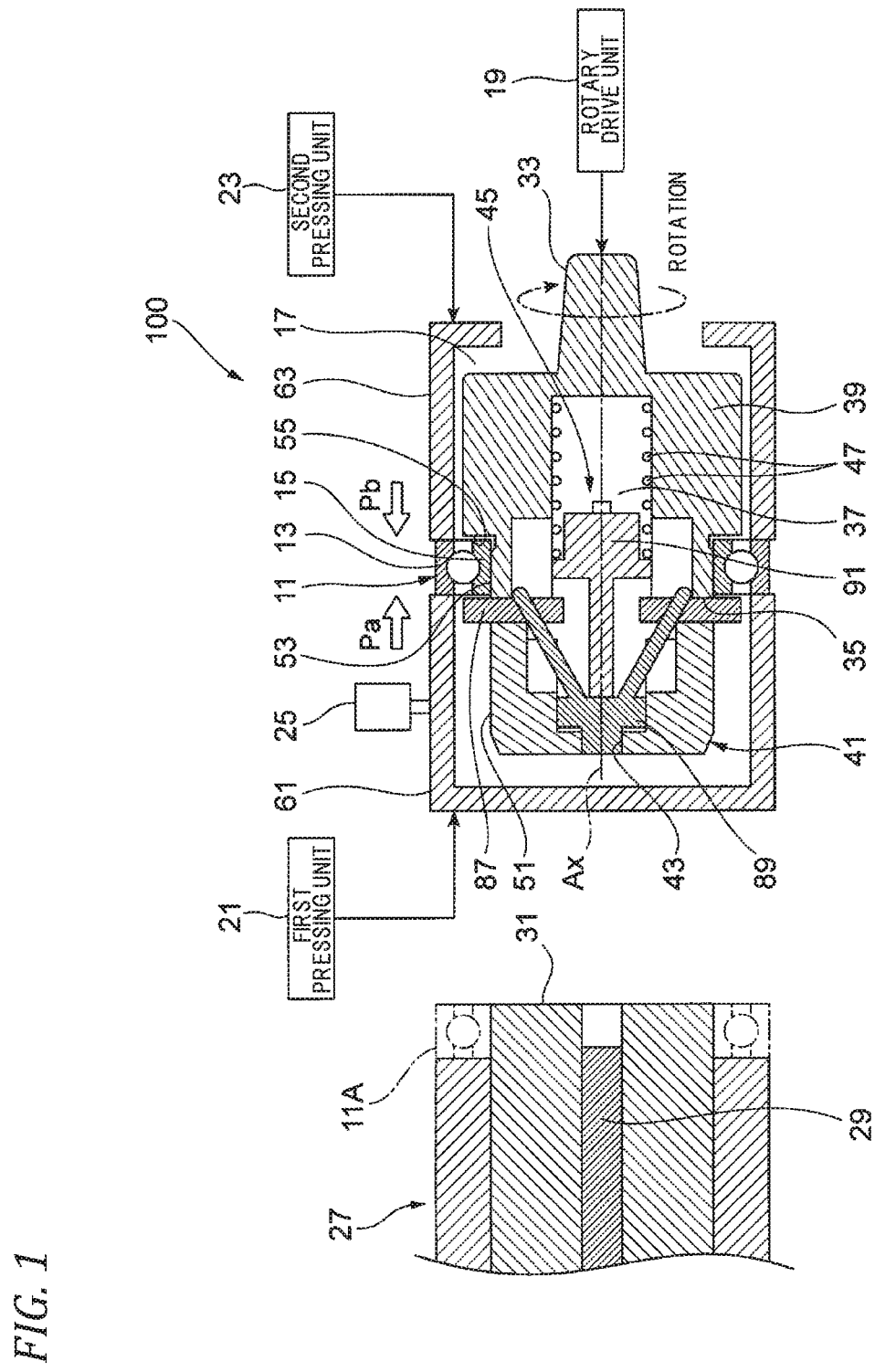
FIG. 1 is an overall configuration view of a ball bearing inspection device, illustrating an illustrative embodiment of the present invention.

FIG. 1 is an overall configuration view of a ball bearing inspection device, illustrating an illustrative embodiment of the present invention.

<First Configuration Example>

A ball bearing inspection device 100 (hereinafter simply referred to as 'inspection device') is configured to detect vibration to be generated from a ball bearing 11 to be inspected by relatively rotating an outer ring 13 and an inner ring 15 of the ball bearing 11.

The inspection device 100 includes an arbor 17 having a circular section and an outer circumferential surface to which the ball bearing 11 is fitted, a rotary drive unit 19 configured to rotationally drive the arbor 17 about a rotation axis Ax, a first pressing unit 21 and a second pressing unit 23 configured to apply a preload to the ball bearing 11, and a vibration detection unit 25 configured to detect the vibration from the ball bearing 11.

The inspection device 100 includes a loading unit 27 configured to supply the ball bearing 11 to the arbor 17. The loading unit 27 is arranged on a side concentric with the rotation axis Ax of the arbor 17 and opposite to the rotary drive unit 19 and is configured to freely advance and retreat along the rotation axis Ax. A ball bearing (a ball bearing 11A shown with the dotted line in FIG. 1) to be supplied to the arbor 17 is detachably supported to one end portion 31 of the loading unit 27 facing toward the arbor 17.

A pusher 29 is mounted to a central axis part of the loading unit 27 so that it can protrude in an axial direction with respect to the arbor 17. The pusher 29 is mounted to the loading unit 27, an that the configuration of the inspection device 100 can be simplified. The present invention is not limited to the configuration where pusher 29 is provided for the loading unit 27. For example, the pusher may be singly provided or may be attached to another member. That is, the pusher is preferably configured to be separable from the arbor 17.

In the specification, a side of the arbor 17 facing toward the loading unit 27 is referred to as an axial tip-side (or a tip-side), and a side of the arbor 17 facing toward the rotary drive unit is referred to as an axial rear end-side (or a rear end-side).

The arbor 17 has an arbor main body 39, a cover member 41, a moveable flange 87, and a flange drive mechanism configured to drive the moveable flange 87 (which will be described in detail later). The arbor main body 39 has a tapered portion 33 formed at one end portion of the axial rear end-side and provided to connect a rotary shaft (not shown) and an opening formed at the other end portion 35 opposite to the tapered portion 33, and a piston accommodation part 37 (which will be described in detail later) is formed therein. The cover member 41 is configured to cover the other end portion 35 of the arbor main body 39 and to close the opening of the piston accommodation part 37. The moveable flange 87 is arranged between the arbor main body 39 and the cover member 41.

A center of an end portion of the axial tip-side of the cover member 41 is formed with an insertion hole 43 (which will be described in detail later) for inserting therein the pusher 29 of the loading unit 27.

A piston unit 45 and a compression spring 47 configured to urge the piston unit 45 toward the axial tip-side are accommodated in the piston accommodation part 37 inside the arbor main body 39 and the cover member 41. The piston unit 45 has an opening and closing member 89 and a piston 91, and is supported to freely move in the axial direction in the piston accommodation part 37.

The arbor main body 39 has a tip-side outer circumferential surface 53 flush with an outer circumferential surface 51 of the cover member 41 and an abutting part 55 protruding radially outward from the tip-side outer circumferential surface 53. The abutting part 55 can contact a side surface of the inner ring 15 of the ball bearing 11 and is formed to have a radial height at which it does not interfere with the outer ring 13. The abutting part 55 may be formed by a member such as a pin or a block provided upright from the tip-side outer circumferential surface 53, in addition to a step of the tip-side outer circumferential surface 53.

The rotary drive unit 19 has a motor configured to supply a rotary drive force to the rotary shaft (not shown) connected to the tapered portion 33 of the arbor main body 39 and configured to support the arbor 17, via a gear, a belt or the like.

A bottomed cylindrical tip-side pressing ring 61 configured to contact a side surface of the outer ring 13 facing toward the loading unit 27 and a bottomed cylindrical base end-side pressing ring 63 configured to contact a side surface of the outer ring 13 facing toward the rotary drive unit 19 are arranged at a radially outer side of the arbor 17.

The tip-side pressing ring 61 is configured to transmit an axial pressing force (Pa denoted with an arrow in FIG. 1) from the first pressing unit 21 to the outer ring 13. The base end-side pressing ring 63 is configured to transmit an axial pressing force (Pb denoted with an arrow in FIG. 1), which is opposite to the pressing direction of the first pressing unit 21, from the second pressing unit 23 to the outer ring 13.

Figure 2A:
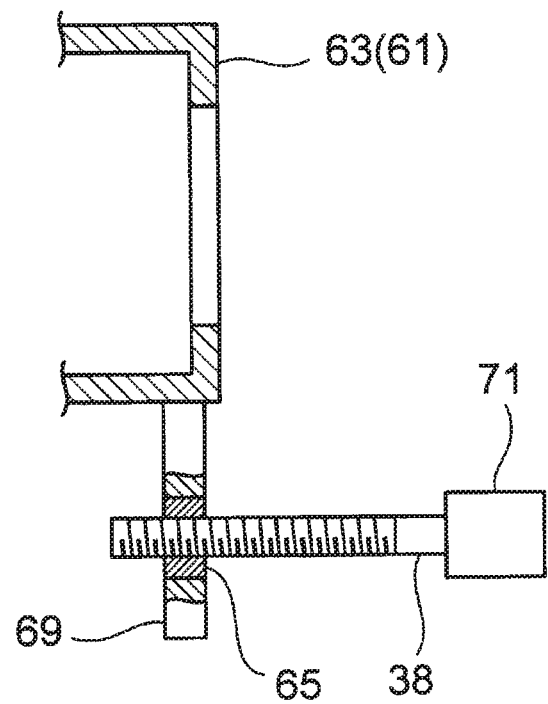
FIG. 2A is a schematic configuration view of a pressing unit using a ball screw-nut mechanism, depicting a configuration example of a first pressing unit and a second pressing unit.

The first pressing unit 21 is preferably configured to press and drive the tip-side pressing ring 61, and the second pressing unit 23 is preferably configured to press and drive the base nd-side pressing ring 63. That is, the configurations thereof are not particularly limited. For example, as shown in FIG. 2A, a ball screw-nut mechanism where a pressing arm 69 meshed with a ball screw 38 via a nut 65 is coupled to the base end-side pressing ring 63 (or the tip-side pressing ring 61) may be used In this case, the ball screw 38 is rotated by a servo motor 71, so that the outer ring of the ball bearing is axially pressed via the base end-side pressing ring 63 (61), thereby applying the preload to the ball bearing.

Figure 2B:
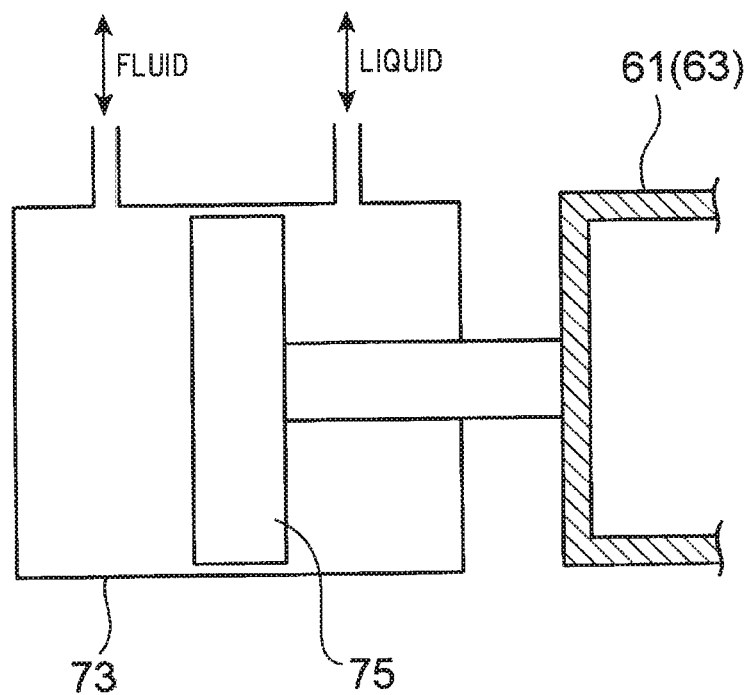
FIG. 2B is a schematic configuration view of the pressing unit using a cylinder piston mechanism, depicting a configuration example of the first pressing unit and the second pressing unit.

Also, as shown in FIG. 2B, a configuration where the tip-side pressing ring 61 (or the base end-side pressing ring 63) is driven by a cylinder piston mechanism is also possible. In this case, a piston 75 in a cylinder 73 is axially driven by outflow and inflow of a fluid, so that the outer ring is axially pressed via the tip-side pressing ring 61 (63), thereby applying the preload to the ball bearing.

The vibration detection unit 25 consists of an acceleration sensor, a displacement sensor, a speed sensor, a microphone sensor and the like, for example, and is configured to convert the detected vibration into an electric signal.

Herein, each process of a basis inspection method of detecting the vibration of the ball bearing by using the inspection device 100 having the above configuration is described.

Figure 3:
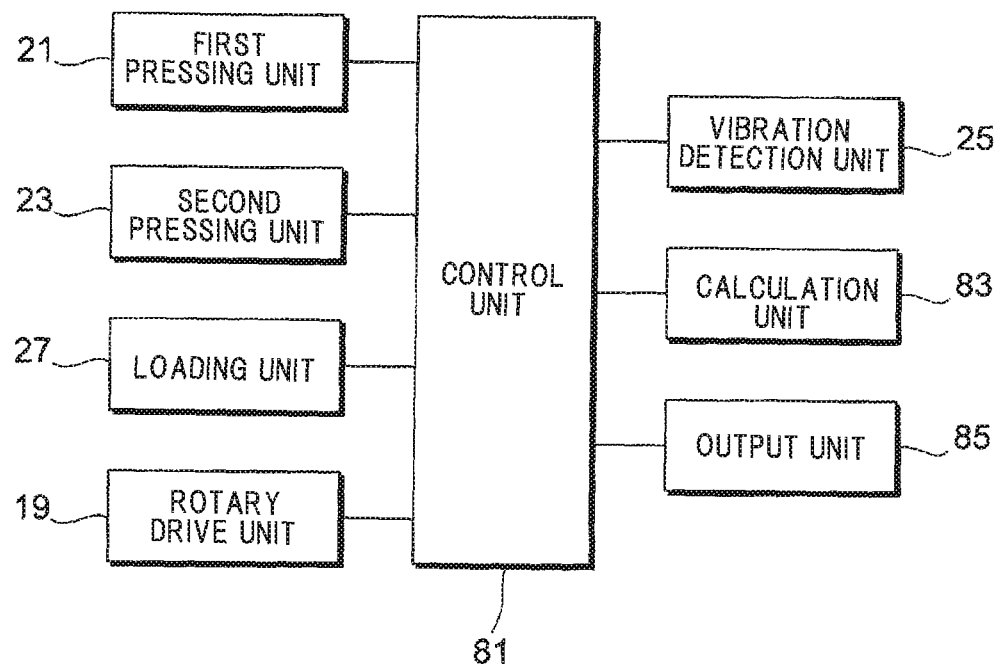
FIG. 3 is a control block diagram of an inspection device

FIG. 3 is a control block diagram of the inspection device 100. A control unit 81 of the inspection device 100 is configured to drive the loading unit 27, to attach the ball bearing 11 to an outer circumference of the arbor 17 and to restrain axial movement of the ball bearing 11. Also, the control unit 81 is configured to drive the rotary drive unit 19, thereby rotationally driving the arbor 17 via the rotary shaft (not shown). Thereby, the inner ring 15 of the ball bearing 11 is rotationally driven.

Figure 4A:
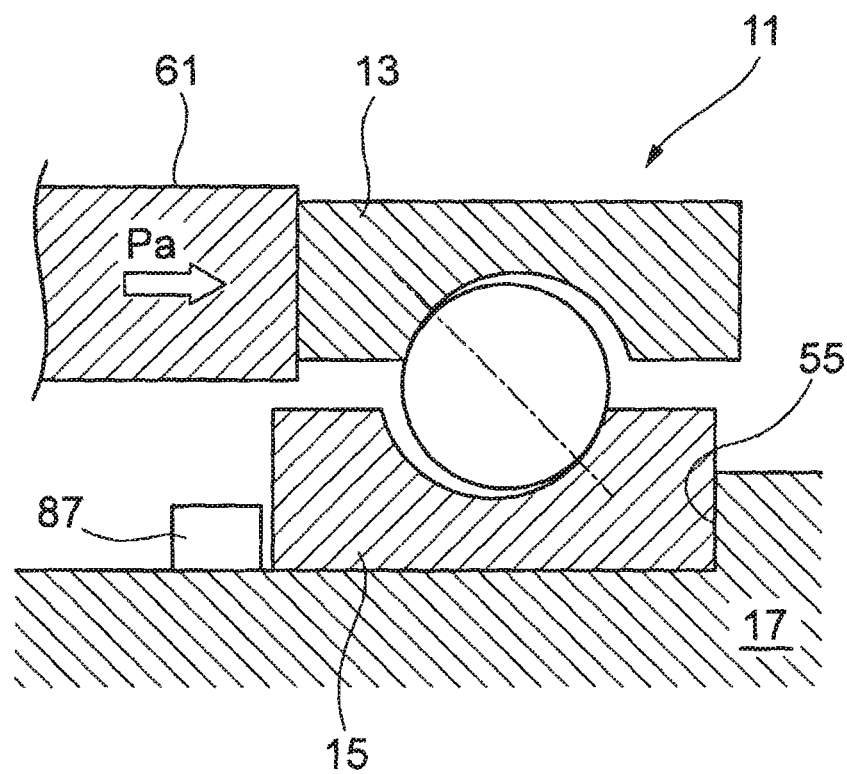
FIG. 4A illustrates a state where a ball bearing is applied with a preload by a pressing force Pa.

When the control unit 81 drives the first pressing unit 21 to axially press a side surface of the outer ring 13, the outer ring 13 of the ball bearing 11 is displaced in a right direction of FIG. 4A (toward the rear end-side) with respect to the inner ring 15, as shown in FIG. 4A. Also, when the control unit 81 drives the second pressing unit 23 to axially press a side surface of the outer ring 13, the outer ring 13 of the ball bearing 11 is displaced in a left direction of FIG. 4B (toward the tip-side) with respect to the inner ring 15, as shown in FIG. 4B.

Figure 4B:
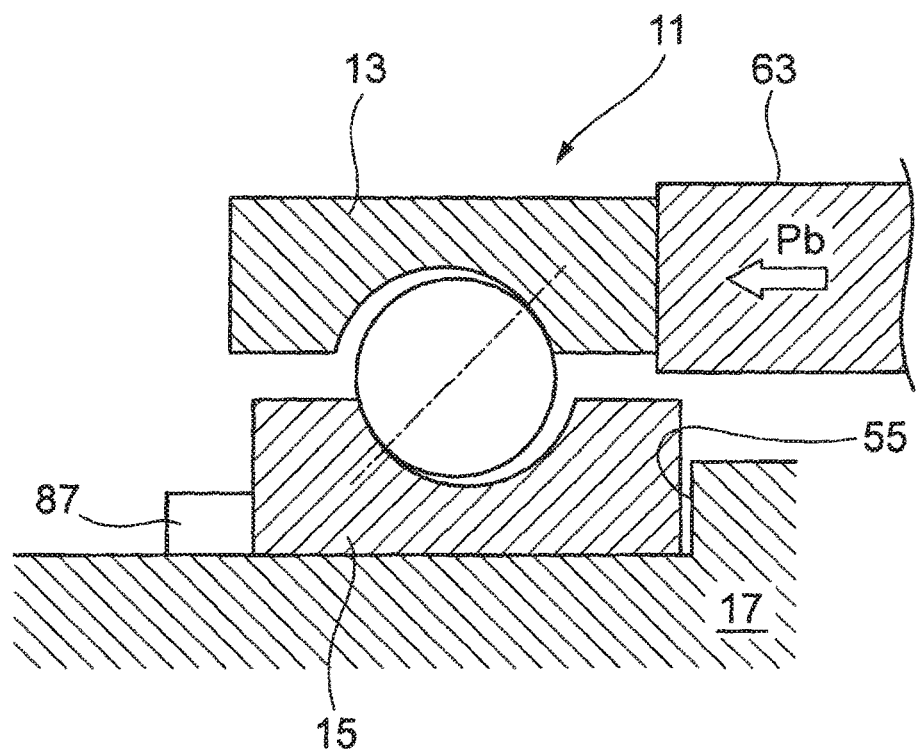
FIG. 4B illustrates a state where the ball bearing is applied with the preload by a pressing force Pb.

The control unit 81 is configured to detect the vibration from the ball bearing 11 by the vibration detection unit 25 at the preload applied state shown in FIG. 4A and the preload applied state shown in FIG. 4B. The control unit 81 is configured to output vibration data, which is a vibration detection result at each preload applied state, to a calculation unit 83. The calculation unit 83 is configured to frequency-analyze the input vibration data and to obtain strengths at each frequency of diverse evaluation values for evaluating the ball bearing 11 by calculation. The control unit is configured to determine whether the ball bearing 11 is good or bad by comparing strengths at a variety of important frequencies determined from the specifications of the bearing and relative rotating speeds of the inner and outer rings upon the measurement, for example an outer ring flaw frequency Zfc caused due to a flaw of a raceway surface of the outer ring, an inner ring flaw frequency Zfi caused due to a flaw of a raceway surface of the inner ring and a ball flaw frequency 2fb with preset thresholds.

Herein, the outer ring flaw frequency Zfc[Hz] is expressed by an equation (1), the inner ring flaw frequency Zfi[Hz] is expressed by an equation (2), and the ball flaw frequency 2fb[Hz] is expressed by an equation (3).

[equation 1]

$$Zf_c = \frac{f_r}{2}\left(1 - \frac{D_a}{d_m}\cos\alpha\right)Z \quad (1)$$

$$Zf_i = \frac{f_r}{2}\left(1 + \frac{D_a}{d_m}\cos\alpha\right)Z \quad (2)$$

$$2f_b = \frac{d_m}{D_a}f_r\left\{1 - \left(\frac{D_a}{d_m}\right)^2\cos^2\alpha\right\} \quad (3)$$

fr: rotating speed [Hz] of inner ring
Z: number of rolling elements
α: contact angle (degree)
Da: diameter [mm] of rolling element
dm: diameter [mm] of pitch circle The control unit 81 is configured to output a result of the determination as to good or bad to an output unit 85. The information about the result of the determination as to good or bad output from the output unit 85 is displayed on a display unit of the inspection device 100 or is provided to an external device connected to the inspection device 100, for example, so that it is provided to the outside, as a detection signal.

After the vibration measurement is over, the control unit 81 drives the loading unit 27 to discharge the ball bearing 11.

As described above, when detecting the vibration of the ball bearing by applying the preloads in the axially different directions, it is necessary to prevent the inner ring 15 from being axially displaced due to the preloads. According to the inspection device 100 having the above configuration, in order to prevent the axial deviation of the inner ring 15, the abutting part 55 is formed on the outer circumferential surface of the arbor 17 so as to face one side surface of the inner ring 15. Also, the moveable flange 87 protrudes radially outward from the outer circumferential surface of the arbor 17 so as to face the other side surface of the inner ring 15.

Subsequently, a mechanism configured to switch the moveable flange 87 between a first state where the moveable flange protrudes from the outer circumferential surface of the arbor 17 and a second state where the moveable flange is accommodated in the arbor 17 is described in detail. In the below, the same members as the above-described members are denoted with the same reference numerals and the descriptions thereof are simplified or omitted.

Figure 5A:
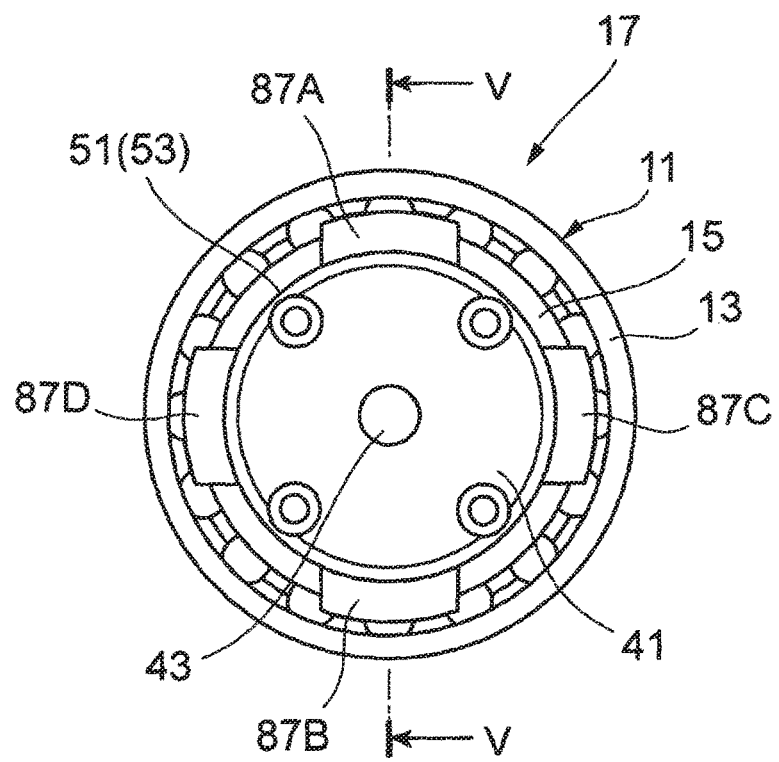
FIG. 5A is a front view of an arbor, as seen front an axial tip-side.
Figure 5B:
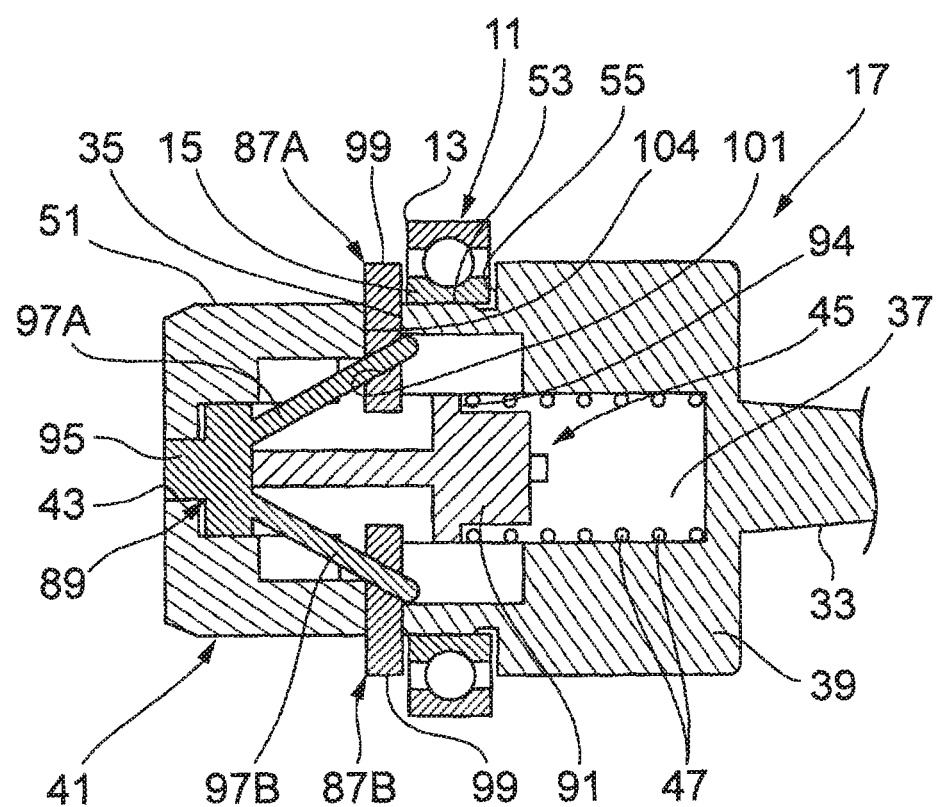
FIG. 5B is a partially sectional view of the arbor taken along a line V-V of FIG. 5A.

FIG. 5A is a front view of the arbor 17, as seen from the axial tip-side, and FIG. 5B is a partially sectional view of the arbor 17 taken along a line V-V of FIG. 5A.

The inner ring 15 of the ball bearing 11 is fixed to the tip-side outer circumferential surface 53 of the arbor main body 39. The moveable flanges 87A, 87B, 87C, 87D are arranged to freely protrude and retract in the radial direction from the tip-side outer circumferential surface 53 at a radial height at which the moveable flanges can contact a side surface of the inner ring 15 and are lower than the outer ring 13.

In the first configuration example, the moveable flanges 87A, 87B, 87C, 87D are arranged at four equidistantly spaced places along a circumferential direction of the arbor 17. However, the present invention is not limited thereto. For example, the moveable flanges may be arranged at a plurality of arbitrary places such as at two or three equidistantly spaced places.

Figure 6:
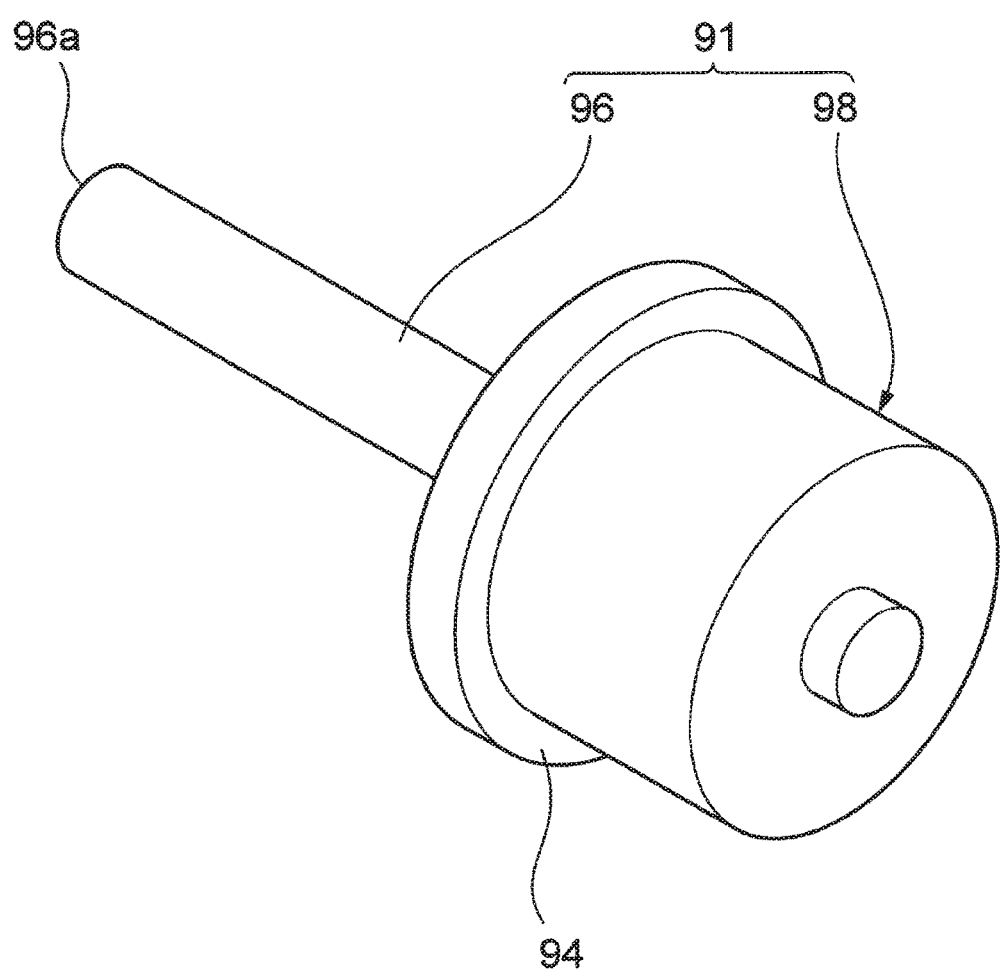
FIG. 6 is a perspective view of depicting an outward appearance of a piston.

FIG. 6 is a perspective view of depicting an outward appearance of the piston 91. The piston 91 has a small-diameter part 96 at a tip-side and a large-diameter part 98 having a step portion 94 formed at a rear end-side. The large-diameter part 98 is inserted into the piston accommodation part 37 of the arbor main body 39 shown in FIGS. 5A and 5B, and one end portion of the compression spring 47 is engaged to the step portion 94. The piston 91 is configured to be urged toward the opening and closing member 89 by the compression spring 47. Also, a tip of the small-diameter part 96 is in contact with the opening and closing member 89. Thereby, the small-diameter part 96 is applied with an axial force from the opening and closing member 89, and transmits an elastic restoring force of the compression spring 47 to the opening and closing member 89.

Figure 7:
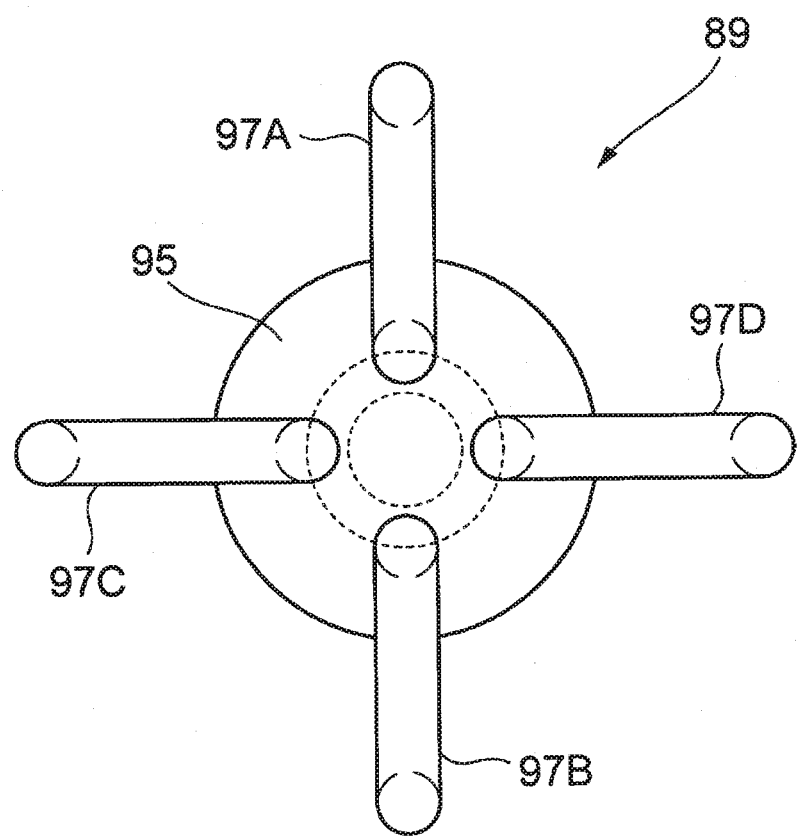
FIG. 7 is a rear view of an opening and closing member, as seen from an axial rear end-side.

FIG. 7 is a rear view of the opening and closing member 89, as seen from an axial rear end-side. The opening and closing member 89 has a base part 95 and inclined pins 97A, 97B, 97C, 97D provided at a rear end portion of the base part 95 with being equidistantly spaced in a radial form and having a radial length gradually decreasing toward the axial rear side.

The respective inclined surfaces 93A, 93B, 93C, 93D have the same inclined angle from the rotation axis Ax, and the respective inclined pins 97A, 97B, 97C, 97D also have the same inclined angle from the rotation axis Ax.

The respective inclined pins 97A, 97B, 97C, 97D are configured to engage with the respective corresponding moveable flanges 87A, 87B, 87C, 87D and to radially displace the moveable flanges. The inclined pin 97A of the opening and closing member 89 is provided in correspondence to the moveable flange 87A, and the inclined pin 97B is provided in correspondence to the moveable flange 87B. Also, the inclined pin 97C is provided in correspondence to the moveable flange 87C, and the inclined pin 97D is provided in correspondence to the moveable flange 87D.

Figure 8A:
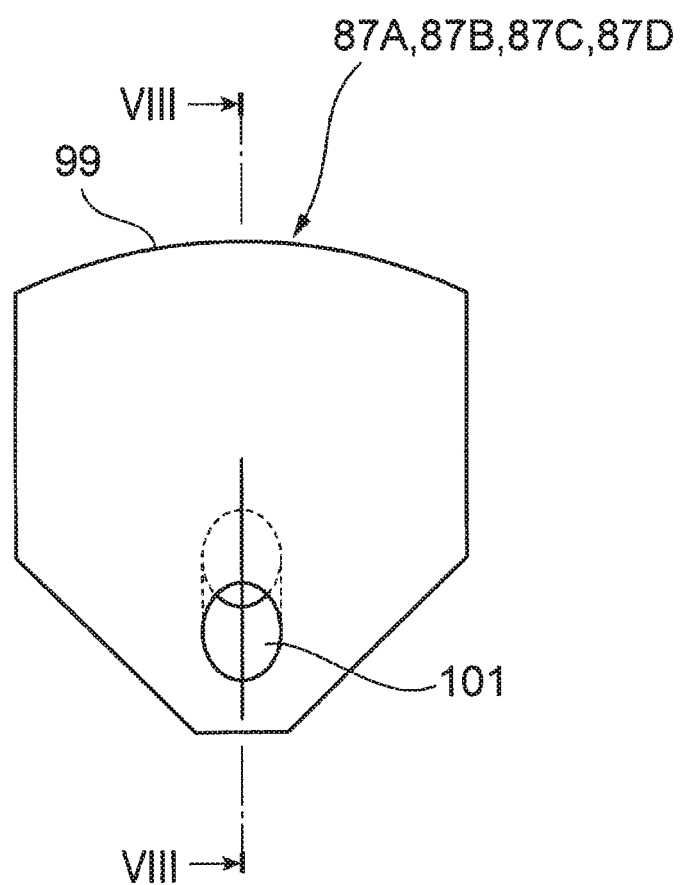
FIG. 8A is a front view of a single body of a moveable flange.
Figure 8B:
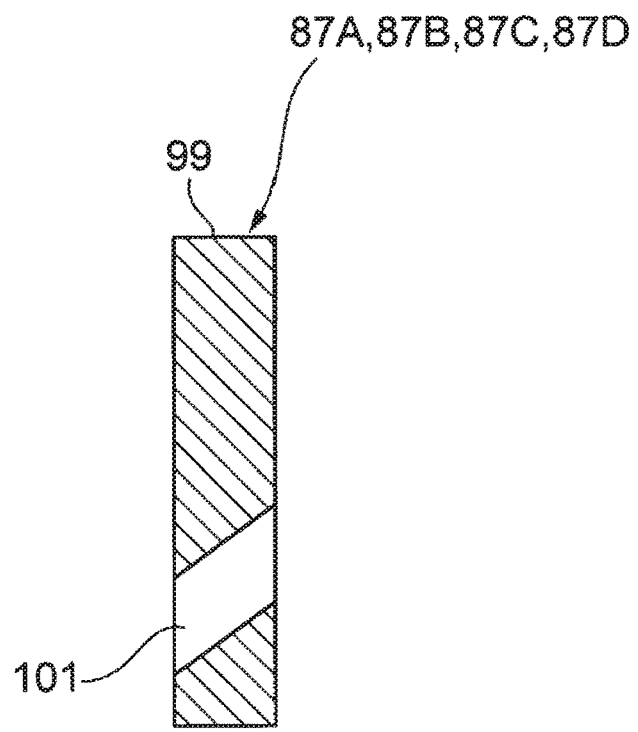
FIG. 8B is a sectional view of the moveable flange taken along a line VIII-VIII of FIG. 8A.

FIG. 8A is a front view of a single body of the moveable flange 87, and FIG. 8B is a sectional view of the moveable flange 87 taken along a line VIII-VIII of FIG. 8A. Each of the moveable flanges 87A, 87B, 87C, 87D is a plate-shaped piece having an circular arc end 99 protruding from the outer circumferential surface of the arbor 17 and a communication hole 101 formed at an opposite side to the circular arc end 99, provided so as to insert therein each of the corresponding inclined pins 97A, 97B, 97C, 97D of the opening and closing member 89 and inclined in a thickness direction.

As shown in FIG. 5B, each of the moveable flanges 87A, 87B, 87C, 87D is sandwiched between the e other end portion 35 of the arbor main body 39 and a rear end portion 104 of the cover member 41 with the corresponding inclined pin being inserted into the communication hole 101. Thereby, the respective moveable flanges 87A, 87B, 87C, 87D are restrained from axially moving and can slide in the radial direction by the movement of the corresponding inclined pins 97A, 97B, 97C, 97D.

Subsequently, an operation of protruding and retracting the moveable flange 87 radially from the outer circumferential surface 53 of the arbor 17 is described.

Figure 9A:
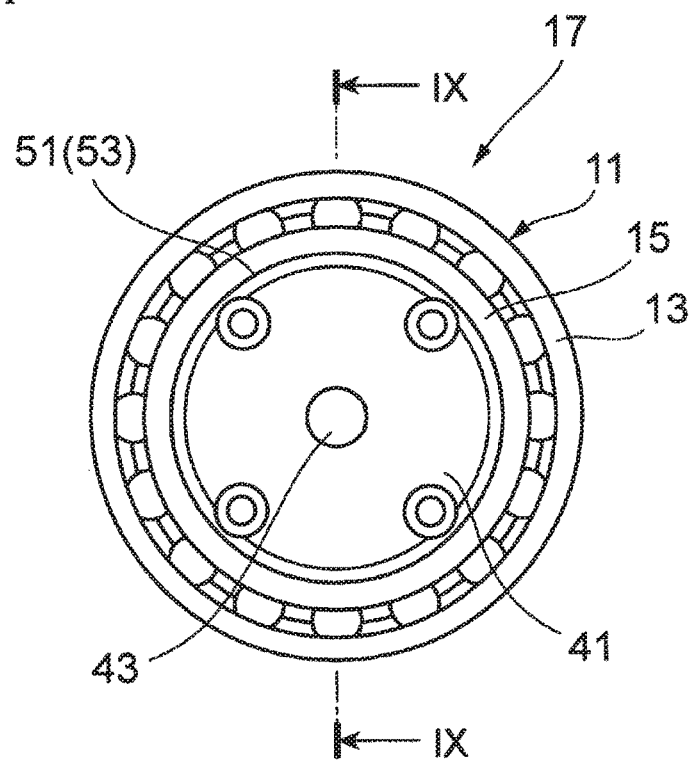
FIG. 9A is a front view of the arbor, depicting a state where a piston unit is axially moved by a pusher and the moveable flanges are thus made not to protrude from an outer circumferential surface of the arbor.
Figure 9B:
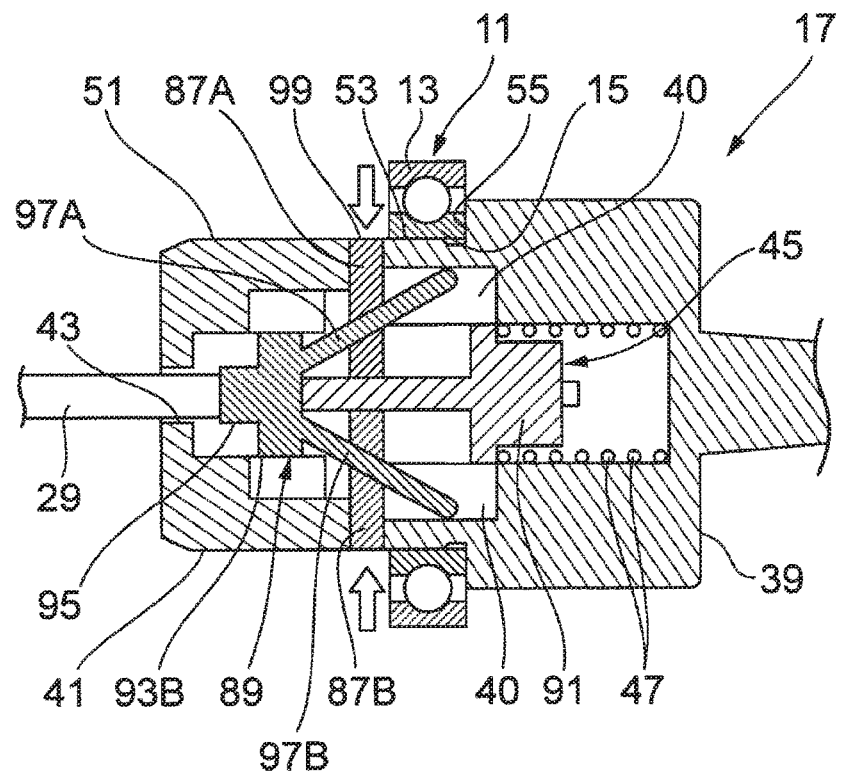
FIG. 9B is a partially sectional view of the arbor taken along a line IX-IX of FIG. 9A, depicting a state where the piston unit is axially moved by the pusher and the moveable flanges are thus made not to protrude from the outer circumferential surface of the arbor.

FIGS. 9A and 9B depict the arbor 17 where the piston unit 45 is moved toward the axial rear end-side by the pusher 29 from the loading unit 27 shown in FIG. 1 and the moveable flange 87 is thus made not to protrude from the outer circumferential surface 53 of the arbor 17 (the outer circumferential surface 51 of the cover member 41). FIG. 9A is a front view of the arbor 17 and FIG. 9B is a partially sectional view of the arbor 17 taken along a line IX-IX of FIG. 9A.

As shown in FIG. 9B, the pusher 29 serving as the drive force supply unit configured to supply a drive force by which the piston unit 45 moves the moveable flange 87 protrudes axially so as to press the base part 95 of the opening and closing member 89 toward the axial rear end-side.

As the pusher 29 protrudes, the opening and closing member 89 is axially pressed toward the rear end-side. Thereby, the opening and closing member 89 pushes and compresses the compression spring 47 via the piston 91 and moves toward the rear end-side together with the piston 91 and the moveable flanges 87A, 87B, 87C, 87D.

At this time, the inclined pins 97A, 97B, 97C, 97D of the opening and closing member 89 are axially moved with rotations thereof being restrained in four grooves 40 formed in a radial form at the tip-side of the arbor main body 39 in correspondence to the inclined pins 97A, 97B, 97C, 97D.

Since the respective inclined pins 97A, 97B, 97C, 97D corresponding to the respective moveable flanges 87A, 87B, 87C, 87D are inserted into the communication holes 101, as the opening and closing member 89 is axially moved, the engaging positions of the inclined pins 97A, 97B, 97C, 97D and the communication holes 101 are changed and the respective moveable flanges 87A, 87B, 87C, 87D are moved radially inward.

Thereby, the protruding state of the circular arc ends 99 of the moveable flanges 87A, 87B, 87C, 87D from the outer circumferential surface 53 of the arbor 17 (the outer circumferential surface 51 of the cover member 41) is canceled.

Also, when the pusher 29 pressing the opening and closing member 89 is retreated toward the axial tip-side, the piston 91 and the opening and closing member 89 are moved toward the axial tip-side by the elastic restoring force of the compression spring 47, so that the circular arc ends 99 of the moveable flanges 87A, 87B, 87C, 87D protrude from the outer circumferential surface 53 of the arbor 17.

Subsequently, a sequence of attaching the ball bearing 11 to the arbor 17 having the above-described configuration and restraining axial displacement of the inner ring 15 is stepwise described. FIGS. 10A to 10D illustrate stepwise a sequence of attaching the ball bearing 11 to the arbor 17.

Figure 10A:
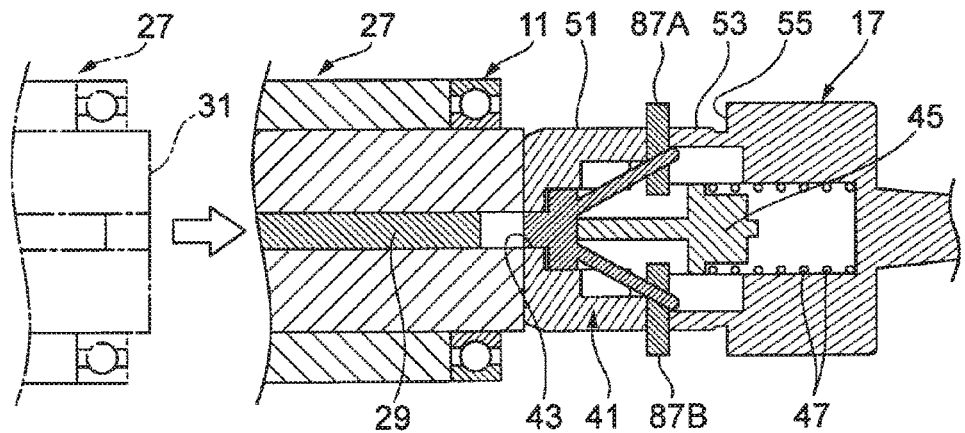
FIG. 10A illustrates stepwise a sequence of attaching the ball bearing to the arbor.

As shown in FIG. 10A, the loading unit 27 having the ball bearing 11, which is an inspection target, set to one end portion 31 is moved along the axial direction of the arbor 17, thereby bringing an end surface of one end portion 31 of the loading unit 27 into contact with a tip surface of the cover member 41 of the arbor 17.

At this time, the piston unit 45 in the arbor 17 is urged toward the axial tip-side (a left side in FIG. 10A) of the arbor 17 by the compression spring 47. Also, the insertion hole 43 of the cover member 41 opens at a position facing be pusher 29 of the loading unit 27.

Figure 10B:
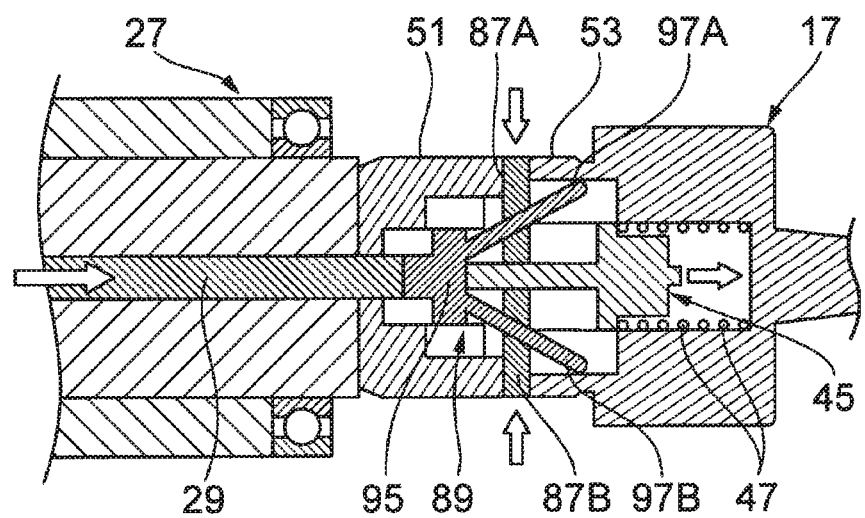
FIG. 10B illustrates stepwise the sequence of attaching the ball bearing to the arbor.

Then, as shown in FIG. 10B, the pusher 29 of the loading unit 27 is made to protrude toward the arbor 17, on that the base part 95 of the opening and closing member 89 is pressed toward the axial rear end-side by the pusher 29. Thereby, the piston unit 45 is moved toward the axial rear end-side while pushing and compressing the compression spring 47. When the axial position of the opening and closing member 89 is changed as a result of the movement of the piston unit 45, the moveable flanges 87A, 87B (also the moveable flanges 87C, 87D (not shown)) having the inclined pins 97A, 97B (also the inclined pins 97C, 97D (not shown)) inserted therein are moved radially inward. Meanwhile, in below descriptions, since the operations of the inclined pins 97C, 97D and the moveable flanges 87C, 87D, which are not shown, are the same as the operations of the inclined pins 97A, 97B and the moveable flanges 87A, 87B, the descriptions thereof will be omitted.

When the piston unit 45 is axially moved, the outer circumferential surfaces (the inclined surface inclined relative to the axial direction) of the inclined pins 97A, 97B and the inner circumferential surfaces (the inclined surface inclined relative to the axial direction) of the communication holes 101 of the moveable flanges 87A, 87B slide relative to each other Also, tip inclined surfaces 102 of the radially inner sides of the moveable flanges 87A, 87B and a tip inclined surface 93A of the piston 91 slide relative to each other. Thereby, the moveable flanges 87A, 87B are moved radially inward. As a result, the circular arc ends 99 of the moveable flanges 87A, 87B are accommodated at more inner sides than the outer circumferential surface 53 of the arbor 17 and the outer circumferential surface 51 of the cover member 41.

Figure 10C:
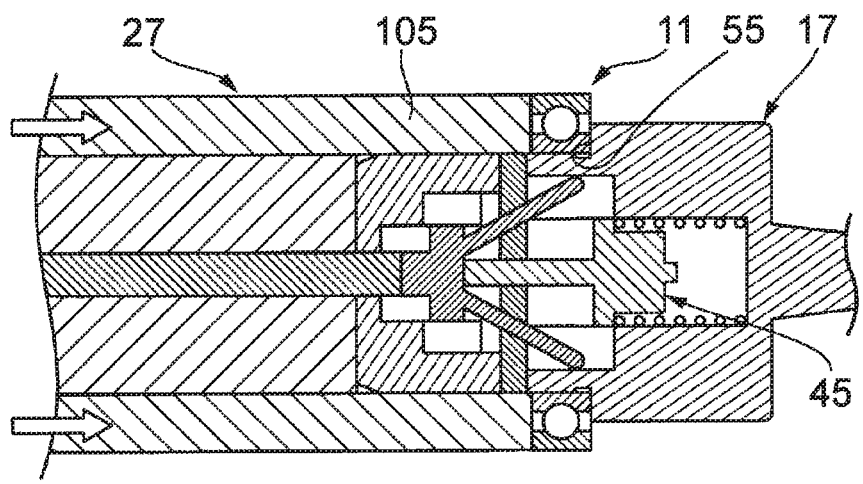
FIG. 10C illustrates stepwise the sequence of attaching the ball bearing to the arbor.

At this state, as shown in FIG. 10C, a work mounting member 108 of the loading unit 27 is made to protrude toward the arbor 17 along the axial direction, thereby moving axially the ball bearing 11 attached to the loading unit 27. Thereby, the ball bearing 11 is abutted to the abutting part 55 of the arbor 17.

Figure 10D:
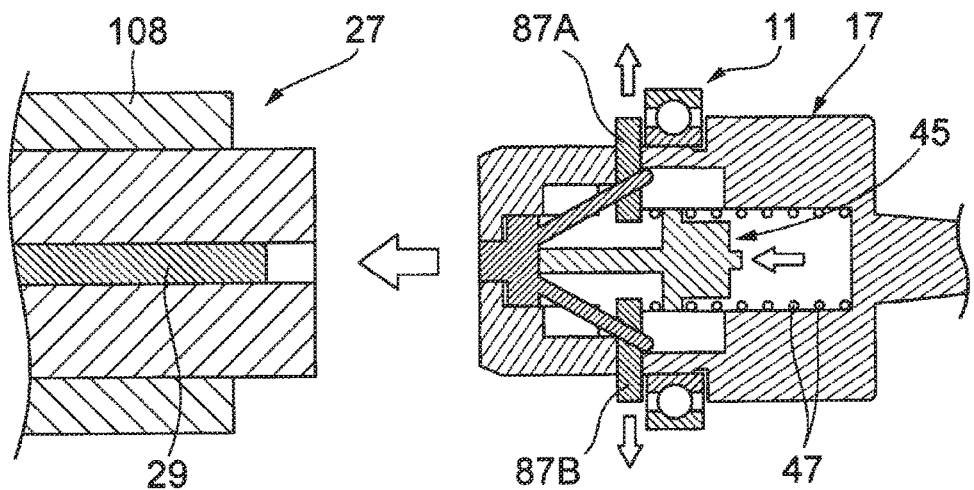
FIG. 10D illustrates stepwise the sequence of attaching the ball bearing to the arbor.

Then, as shown in FIG. 10D, the work mounting member 108 is pulled back toward the loading unit 27, the loading unit 27 is separated from the arbor 17, and the pusher 29 is pulled back into the loading unit 27.

Then, the piston unit 45 in the arbor 17 is applied with the elastic restoring force of the compression spring 47 and is thus moved toward the axial tip-side. By this operation, the moveable flanges 87A, 87B again protrude radially outward, so that the inner ring of the ball bearing 11 is arranged between the abutting part 55 and the moveable flanges 87A, 87B and the axial movement of the inner ring is thus restrained.

As described above, at least one of the piston unit 45 and the moveable flanges 87A, 87B has the inclined surface inclined relative to the axial direction of the arbor 17, and the piston unit 45 and the moveable flanges 87A, 87B slide each other on the inclined surface, so that the axial movement of the piston unit 45 is converted into the radial movement of the moveable flange 87A, 87B.

As a result, one side surface of the inner ring 15 faces the abutting part 55 and the other side surface faces the moveable flanges 87A, 87B, 87C, 87D, so that the axial movement of the ball bearing 11 attached to the arbor 17 is restrained. For this reason, as shown in FIGS. 4A and 4B, even when the outer ring 13 is applied with not only the axially high pressing force Pa but also the high pressing force Pb in the opposite direction to the pressing force Pa, the ball bearing 11 does not axially deviate beyond the abutting part 55 and the moveable flange 87, so that it is possible to stably measure the vibration.

When measuring the vibration by the ball bearing inspection device 100 having the above-described configuration, the ball bearing 11 is first inserted into the arbor 17 with the moveable flange 87 being pressed in the arbor 17, and the side surface of the inner ring of the ball bearing 11 is then contacted to the abutting part 55. After the loading of the ball bearing 11 is over, the moveable flange 87 is made to protrude from the outer circumferential surface of the arbor 17, so that the ball bearing 11 is arranged between the abutting part 55 and the moveable flange 87. Thereby, the axial displacement of the inner ring 15 is blocked by the abutting part 55 of the arbor 17 and the moveable flange 87, and the axial movement of the inner ring 15 of the ball bearing 11 is restrained.

Then, the outer ring 13 of the ball bearing 11 is pressed from the axial tip-side toward the rear end-side by the first pressing unit 21 shown in FIG. 1. At this time, the side surface of the inner ring 15 is contacted to the abutting part 55, so that the preload from the left direction to the right direction in FIG. 4A is applied to the ball bearing 11. At this preload applied state, the arbor 17 is rotationally driven by the rotary drive unit 19 and the inner ring 15 and the outer ring 13 are thus relatively rotated, so that the vibration from the ball bearing 11 is measured by the vibration detection unit 25.

Thereafter, the pressing of the first pressing unit 21 is stopped, and the outer ring of the ball bearing 11 is pressed from the axial rear end-side toward the tip-side by the second pressing unit 23. At this time, the side surface of the inner ring 15 is contacted to the moveable flange 87, so that the preload from the right direction to the left direction in FIG. 4B is applied to the ball bearing 11. At this preload applied state, the arbor 17 is rotationally driven by the rotary drive unit 19 and the inner ring 15 and the outer ring 13 are thus relatively rotated, so that the vibration from the ball bearing 11 is measured by the vibration detection unit 25.

After the vibration measurement is over, the pressing of the second pressing unit 23 is stopped, the moveable flange 87 is again accommodated in the arbor 17, and the ball bearing 11 is picked out.

According to the ball bearing inspection device 100 having the above-described configuration, when loading the ball bearing 11, the moveable flange is pressed into the arbor, so that it is possible to take the ball bearing 11 in and out. Also, when measuring the vibration by applying the preload to the ball bearing 11, which is an inspection target, it is not necessary to reverse the ball bearing 11 in reversing the direction of the pressing force from one preload direction to the other preload direction opposite to the one preload direction. For this reason, a reversal mechanism is not required and the rotary drive shaft can be configured only by one shaft, so that it is possible to simplify the inspection device and to save the equipment cost.

Also, since the vibration to be measured is very small, the inspection device 100 has a restraint that a member other than the vibration detector should not be contacted to the ball bearing 11 or the arbor 17 from the outside during the vibration measurement. However, when attaching or detaching the ball bearing 11 to or from the arbor 17, the vibration measurement is not performed. Therefore, even when the configuration where the opening and closing member 89 is pressed by the pusher 29 is adopted, it does not cause any trouble with respect to the vibration measurement.

<Second Configuration Example>

In the below, a second configuration example of the ball bearing inspection device is described.

Figure 11:
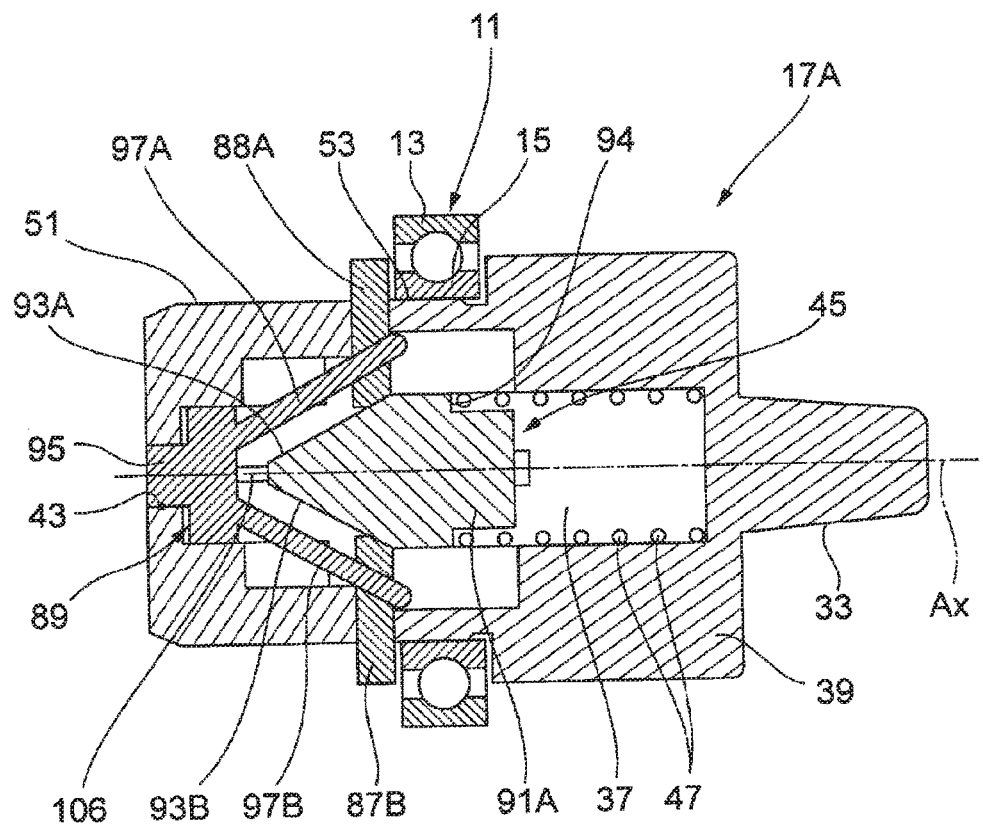
FIG. 11 is an axially sectional view of an arbor of a second configuration example.

FIG. 11 is an axially sectional view of an arbor 17A of a second configuration example.

The arbor 17A of the second configuration example is the same as the first configuration example, except for shapes of a piston 91A and moveable flanges 88A, 88B (also moveable flanges 88C, 88D (not shown)).

Figure 12:
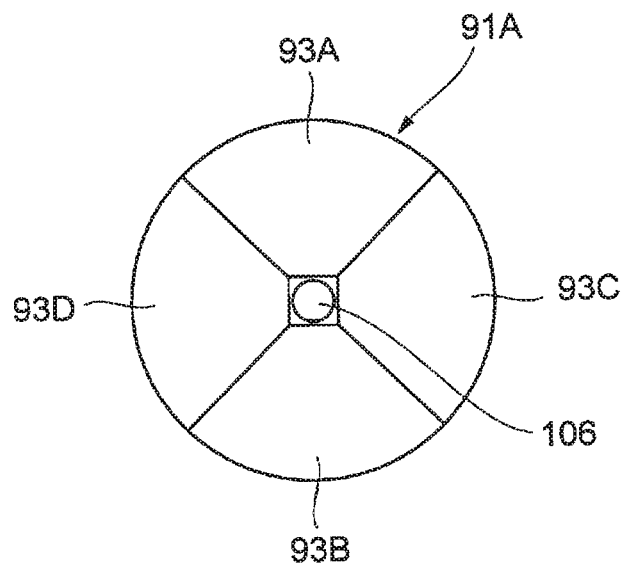
FIG. 12 is a front view of a piston, as seen from the axial tip-side.

FIG. 12 is a front view of the piston 91A of the second configuration example, as seen from the axial tip-side. The piston 91A has inclined surfaces 93A, 93B, 93C, 93D provided at one end portion of a tip-side thereof and tapered toward the axial tip-side. Also, an axial tip of the piston 91A is provided with a protrusion 106 extending axially.

Figure 13:
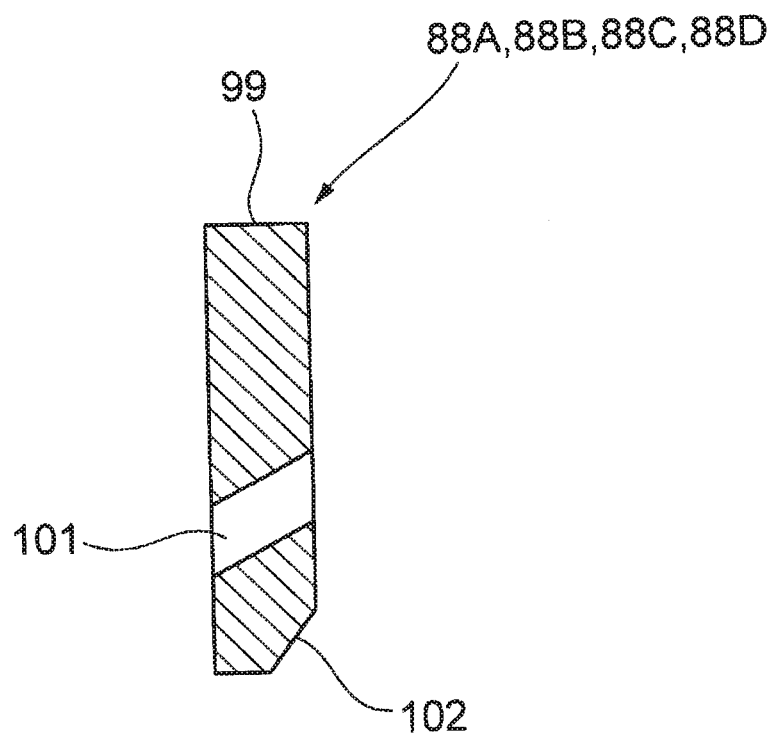
FIG. 13 is a sectional view of a moveable flange.

FIG. 13 is a sectional view of the moveable flanges 88A, 88B, 88C, 88D. An end portion of each of the moveable flanges 88A, 88B, 88C, 88D opposite to the circular arc end 99 is formed with the tip inclined surface 102.

The tip inclined surfaces 102 of the respective moveable flanges are formed so that when the moveable flanges are incorporated into the arbor 17A, the tip inclined surfaces are parallel with the corresponding inclined surfaces 93A, 93B, 93C, 93D of the piston 91A.

Subsequently, the radial movement of the moveable flanges 88A, 88B, 88C, 88D having the above configuration is described.

Figure 14A:
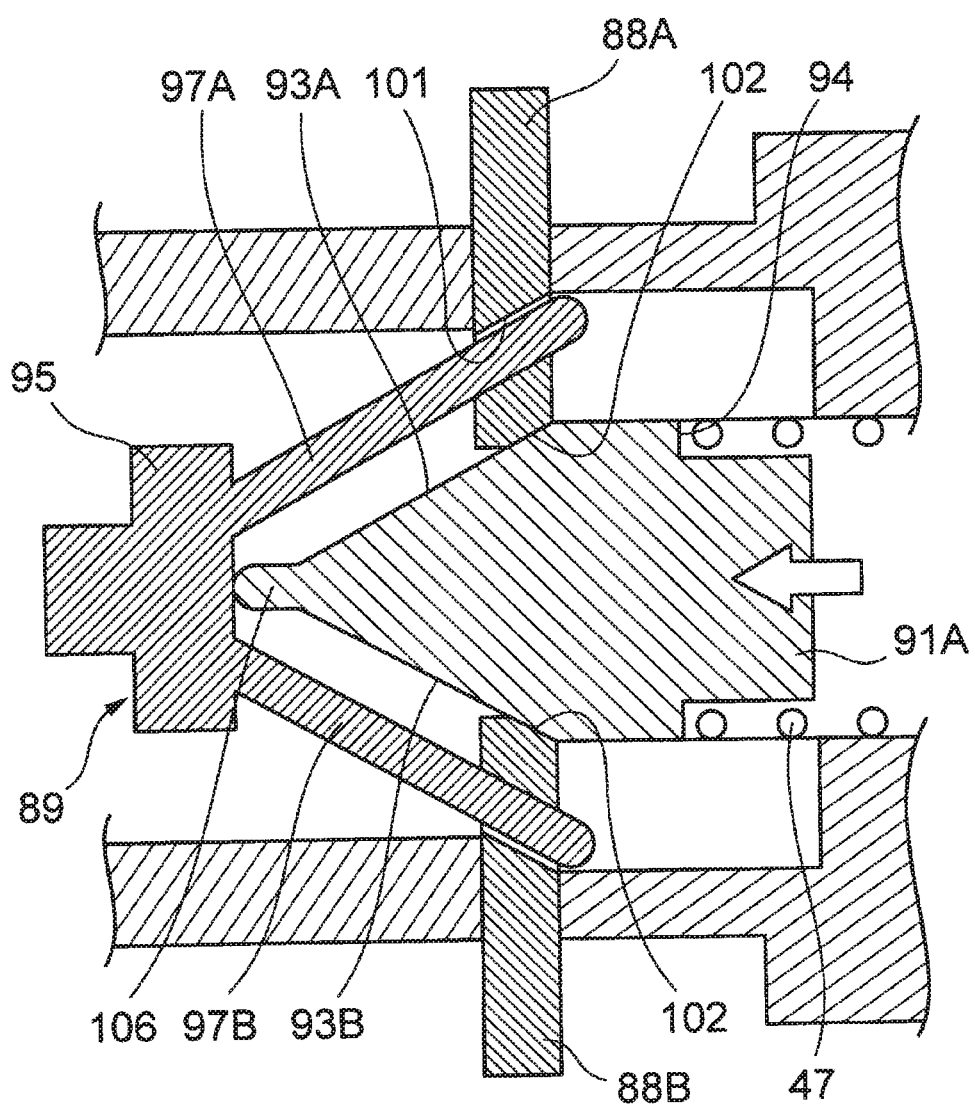
FIG. 14A is a partially sectional view of depicting a state where the piston is urged toward the axial tip-side by a compression spring.
Figure 14B:
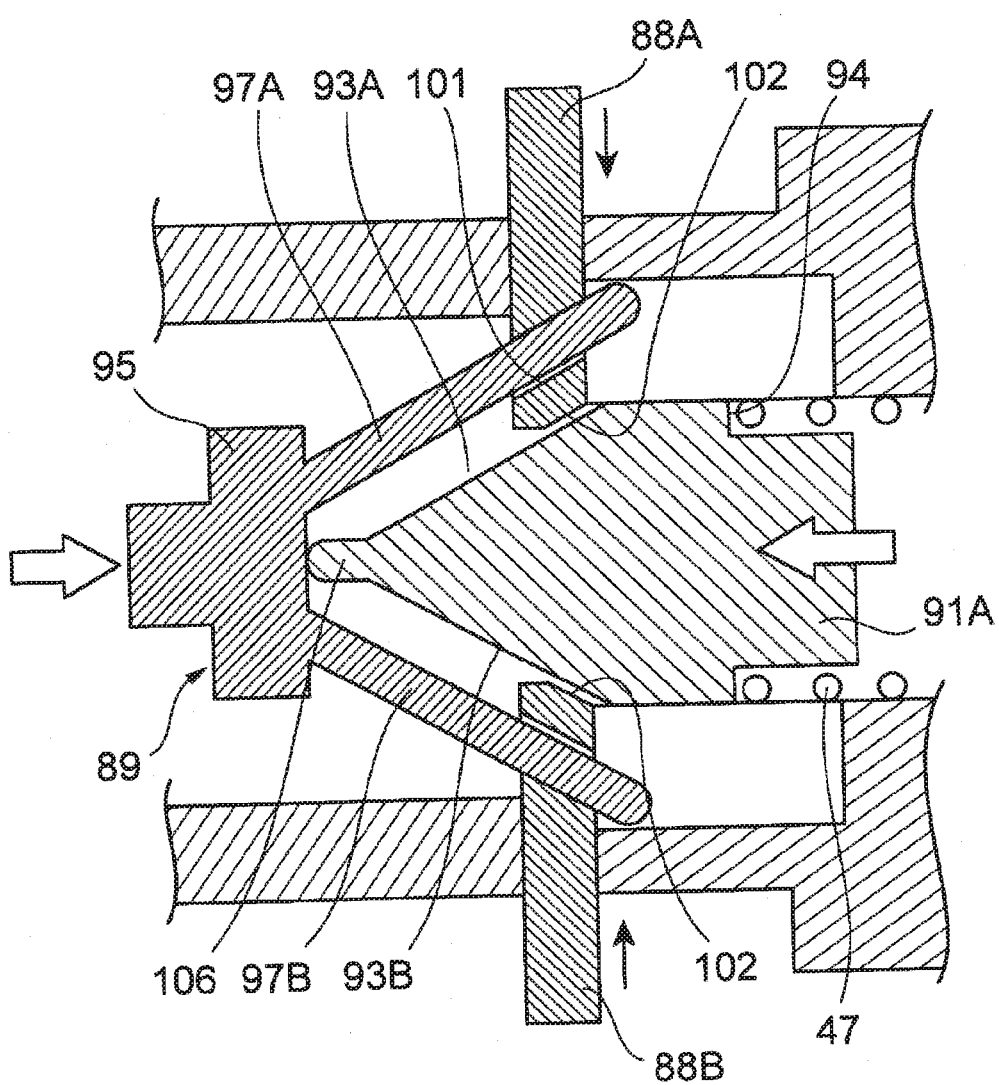
FIG. 14B is a partially sectional view of depicting a state where the opening and closing member starts to be pressed toward the axial rear end-side.

FIG. 14A is a partially sectional view of depicting a state where the piston 91A is urged toward the axial tip-side by the compression spring 47, and FIG. 14B is a partially sectional view of depicting a state where the opening and closing member 89 starts to be pressed toward the axial rear end-side.

As shown in FIG. 14A, at a state where the piston 91A is urged by the compression spring 47, the inclined surface 93A of the piston 91A is in contact with the tip inclined surface 102 of the moveable flange 88A and the inclined surface 93B is in contact with the tip inclined surface 102 of the moveable flange 88B.

As shown in FIG. 14B, when the opening and closing member 89 starts to be pressed toward the axial rear end-side, the protrusion 106 of the piston 91A is contacted to the base part 95 of the opening and closing member 89. When the opening and closing member 89 is continuously further pressed, the opening and closing member 89 moves the piston 91A toward the axial rear end-side via the protrusion 106.

Thereby, the inclined surfaces 93A, 93B of the piston 91A are spaced from the tip inclined surfaces 102, 102 of the moveable flanges 88A, 88B. At this time, the inclined pins 97A, 97B of the opening and closing member 89 are also moved toward the axial rear end-side. However, since the rattling between the communication holes 101, 101 of the moveable flanges and the inclined pins 97A, 97B and the rigidity of the inclined pin 97A are not high, the piston 91A moves toward the axial rear end-side slightly before the operation of closing the moveable flanges 88A, 88B.

Therefore, when closing the moveable flanges 88A, 88B, the inclined pins 97A, 97B of the opening and closing member 89 and the communication holes 101 of the moveable flanges slide relative to each other, so that the moveable flanges 88A, 88B move radially inward. At this time, gaps are formed between the inclined surfaces 93A, 93B of the piston 91A and the corresponding tip inclined surfaces 102, 102, so that a frictional resistance with the inclined surfaces 93A, 93B is not caused.

Figure 15:
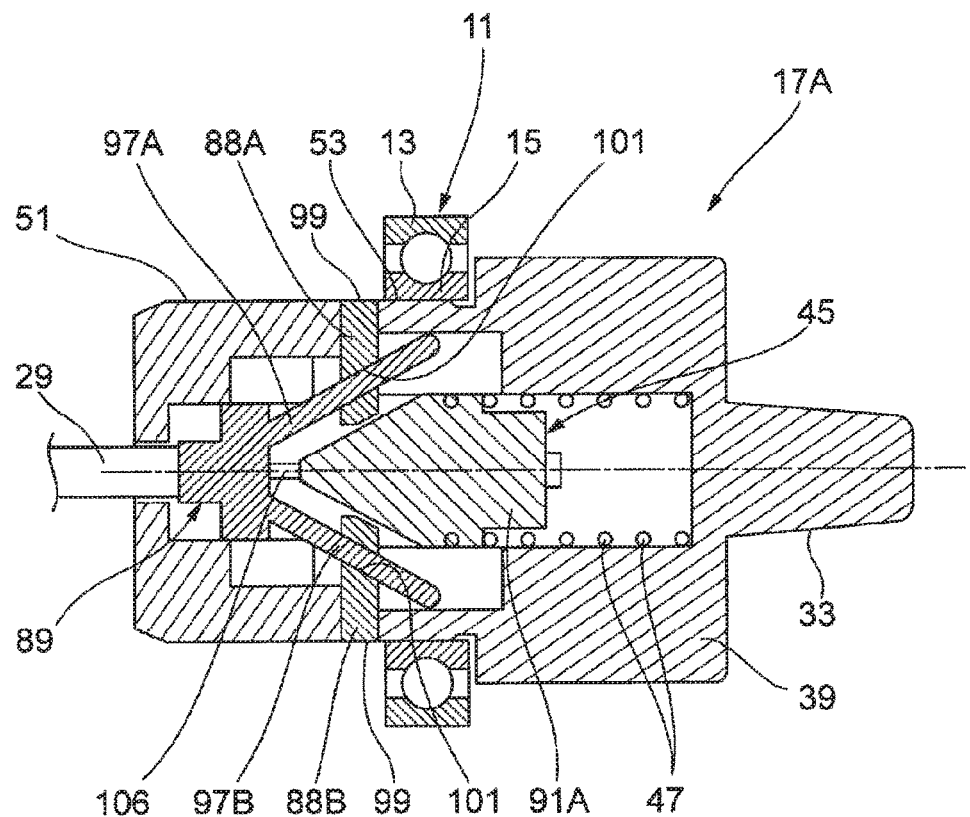
FIG. 15 is a sectional view of depicting a state the moveable flanges are pressed-in toward a radially inner side.

FIG. 15 is a sectional view of depicting a state the moveable flanges are pressed-in toward the radially inner side. The pusher 29 is abutted to the opening and closing member 89, so that the inclined pins 97A, 97B of the opening and closing member 89 slide in the communication holes 101 of the moveable flanges 88A, 88B. As a result, the circular arc ends 99 of the moveable flanges 88A, 88B move to the more radially inner sides than the outer circumferential surfaces 51, 53.

According to the second configuration example, it is possible to radially move the moveable flanges 88A, 88B more smoothly with a small sliding resistance.

Meanwhile, in the first and second configuration examples, the moveable flanges are all the flat plate-shaped members. However, the present invention is not limited thereto.

Figure 16A:
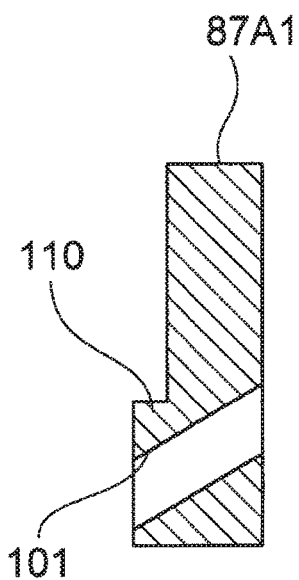
FIG. 16A is a sectional view of depicting a modified embodiment of the moveable flange.
Figure 16B:
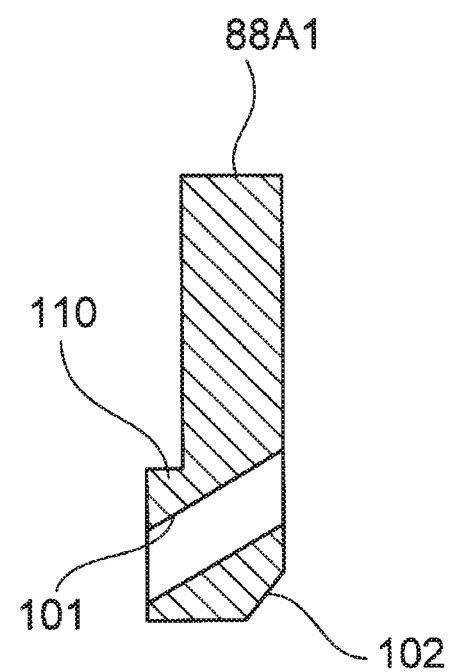
FIG. 16B is a sectioned view of depicting a modified embodiment of the moveable flange.

FIGS. 16A and 16B are sectional views of depicting modified embodiments of the moveable flange. FIG. 16A depicts a moveable flange 87A1 having a step portion 110, which is thick radially inward, as compared to the moveable flange of the first configuration example. FIG. 16B depicts a moveable flange 88A1 having a step portion 110, which is thick radially inward, as compared to the moveable flange of the second configuration example.

Figure 17:
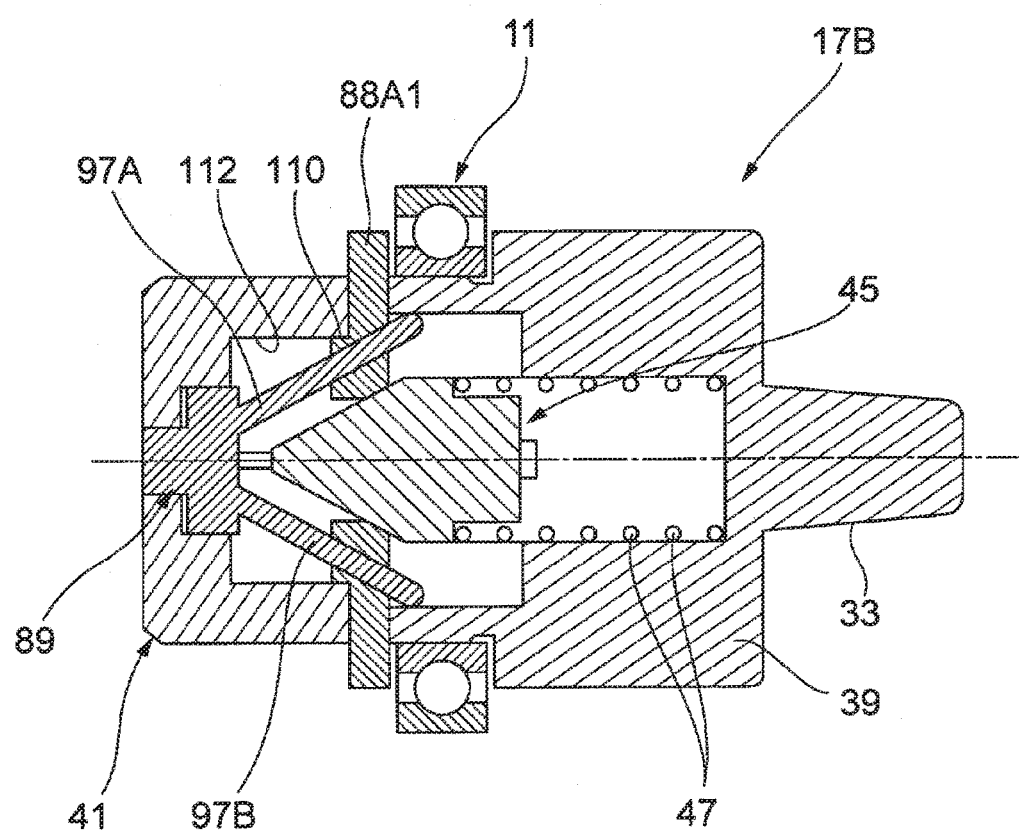
FIG. 17 is a sectional view of an arbor having a configuration where the moveable flange having a step portion provided at a radially inner side is used, as compared to the arbor of the second configuration example.

FIG. 17 is a sectional view of an arbor 17B, depicting a configuration where the moveable flange 88A1 having the step portion 110 provided at a radially inner side is used, as compared to the arbor of the second configuration example. In the meantime, since this configuration applies to the first configuration example, too, the description of the moveable flange 87A1 is omitted.

The step portion 110 of the moveable flange 88A1 is abutted to an inner circumferential surface 112 of the cover member 41, so that the step portion 110 serves as a stopper of the moveable flange 88A1. Thereby, it is possible to counteract the centrifugal force, which is to be generated as the arbor 17B rotates, with sufficient strength.

<Third Configuration Example>

Subsequently, a third configuration example of the ball bearing inspection device is described.

Figure 18A:
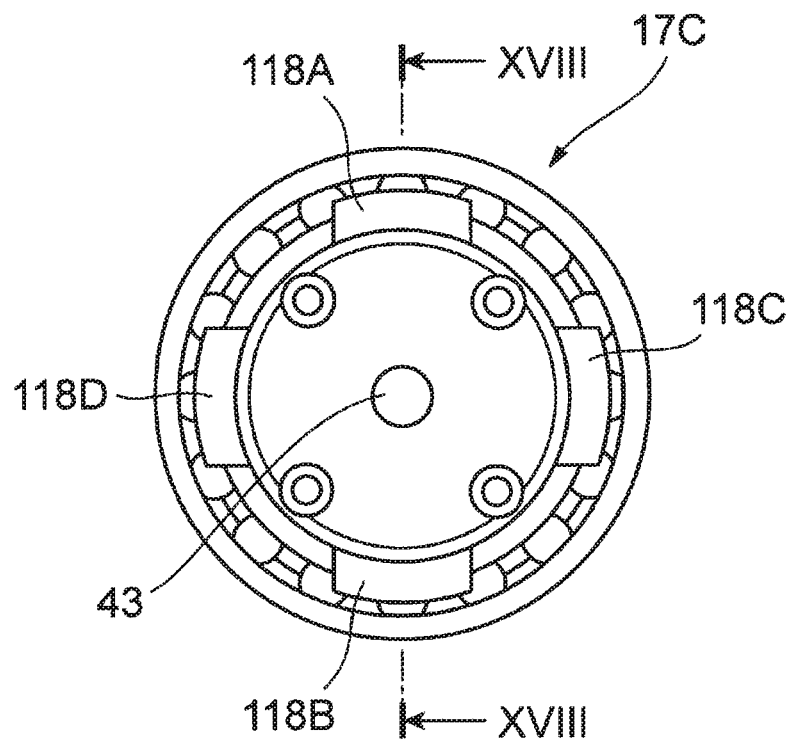
FIG. 18A is a front view of an arbor of a third configuration example, as seen from the axial tip-side.
Figure 18B:
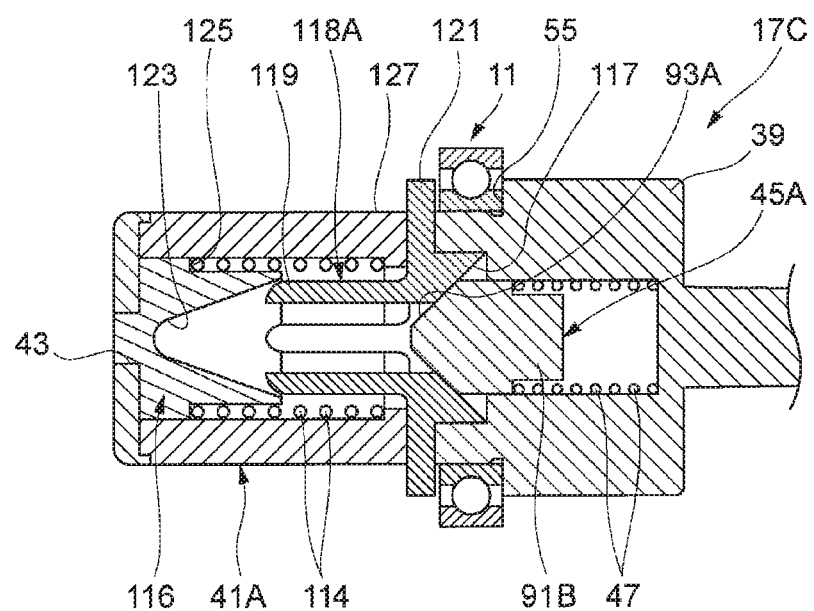
FIG. 18B is a partially sectional view of the arbor taken along a line XVIII-XVIII of FIG. 18A.

FIG. 18A is a front view of an arbor 17C of a third configuration example, as seen from the axial tip-side, and FIG. 18B is a partially sectional view of the arbor 17C taken along a line XVIII-XVIII of FIG. 18A.

In the third configuration example, a piston unit 45A of the arbor 17C is urged toward the tip-side by the compression spring 47 provided at the piston accommodation part 37 of the arbor main body 39 and a compression spring 114 provided in a bottomed cylindrical cover member 41A.

The piston unit 45A has an opening and closing member 116, a plurality of moveable flanges 118A, 118B, 118C, 118D and a piston 91B.

The moveable flange 118A (also the other moveable flanges 118B, 118C, 118D) has an inclined surface 117 configured to sliding-contact the corresponding inclined surface 93A formed at the tip-side of the piston 91B, an extension piece 119 having a straight line shape and extending toward the tip-side, and a flange part 121 extending radially outward, which are integrally formed.

The opening and closing member 116 is substantially cylindrical, and has a concave portion 123 having a conical inner wall surface (inclined surface) at a rear end portion and a step portion 125 formed at a part of an outer circumference and configured to contact the compression spring 114.

In the arbor 17C having the above-described configuration, at a state where the opening and closing member 116 shown in FIG. 18B is not applied with the axial force toward the axial rear end-side, the flange part 121 protrudes radially outward, thereby restraining the axial movement of the ball bearing 11. That is, the piston 91B is urged toward the axial tip-side by the compression spring 47, and the inclined surface 117 of the moveable flange 118A is pressed by the inclined surface 93A of the piston 91B. Thereby, the moveable flange 118A slides radially outward, so that the flange part 121 protrudes from the outer circumferential surface 127 of the arbor 17C.

Figure 19:
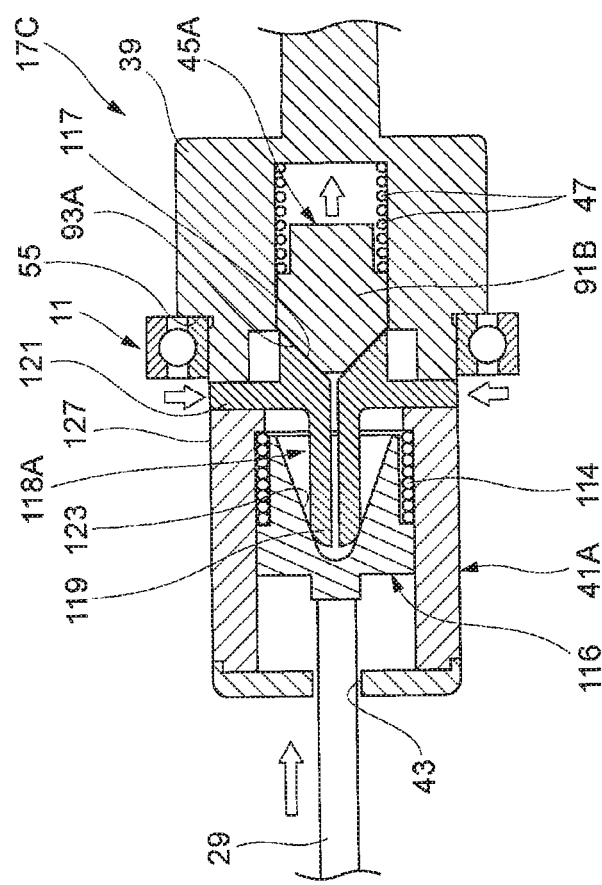
FIG. 19 is a partially sectional view of the arbor, depicting a state where flange parts are accommodated in the arbor without protruding from the outer circumferential surface of the arbor.

FIG. 19 is a partially sectional view of the arbor, depicting a state where the flange parts 121 shown in FIGS. 18A and 18B are accommodated in the arbor 17C without protruding from the outer circumferential surface 127 of the arbor 17C.

The pusher 29 is abutted to the opening and closing member 116 through the insertion hole 43 of the cover member 41A, thereby pressing the opening and closing member 116 against the elastic force of the compression spring 114. As a result, the opening and closing member 116 is moved rearward along the inner circumferential surface of the cover member 41A, so that the straight line-shaped extension piece 119 of the moveable flange 118A is moved radially inward while sliding along the inner wall surface of the concave portion 123 of the opening and closing member 116. Thereby, the flange part 121 of the moveable flange 118A is accommodated in the arbor 17C from the state where it protrudes from the outer circumferential surface 127 of the arbor 17C.

Also by the arbor 17C having the above-described configuration, it is possible to make the flange parts 121 of the moveable flanges 118A, 118B, 118C, 118D protrude and retract from and to the outer circumferential surface 127 of the arbor 17C, and to accomplish the same operational effects as the first configuration example with the simpler mechanism.

<Fourth Configuration Example>

Subsequently, a fourth configuration example of the ball bearing inspection device is described.

Figure 20A:
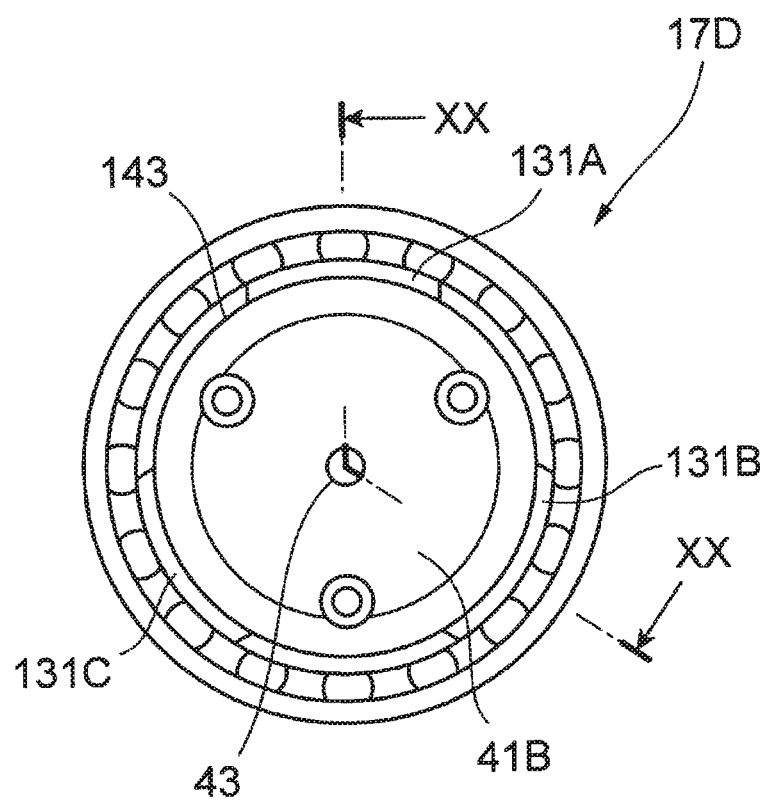
FIG. 20A is a front view of an arbor of a fourth configuration example, as seen from the axial tip-side.
Figure 20B:
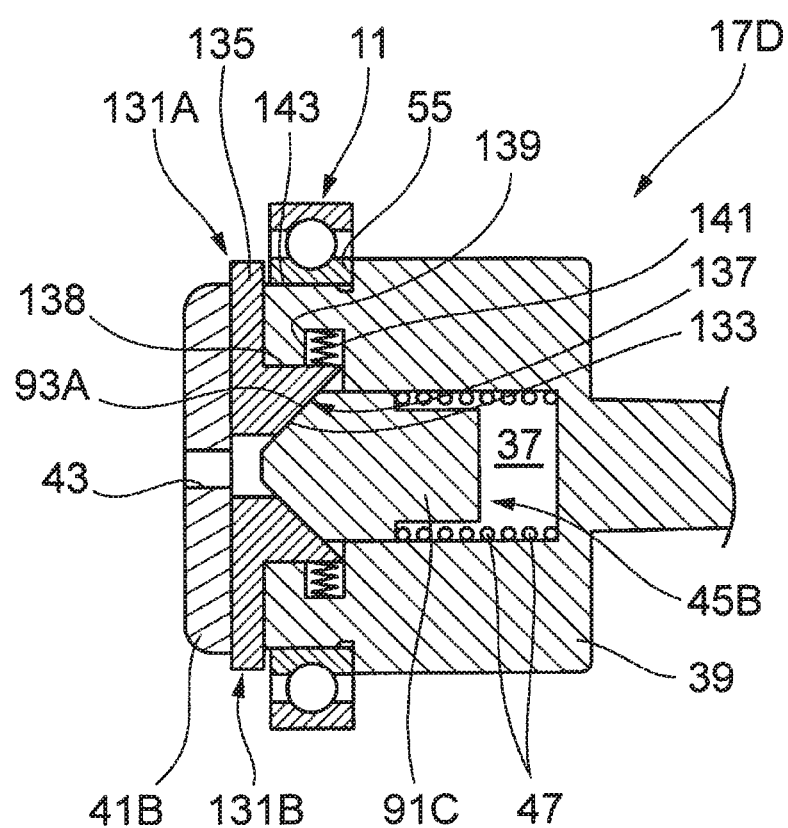
FIG. 20B is a partially sectional view of be arbor taken along a line XX-XX of FIG. 20A.

FIG. 20A is a front view of an arbor 17D of a fourth configuration example, as seen from the axial tip-side, and FIG. 20B is a partially sectional view of the arbor 17D taken along a line XX-XX of FIG. 20A.

In the arbor 17D of the fourth configuration example, a piston unit 45B is urged toward the tip-side by the compression spring 47 provided in the piston accommodation part 37 of the arbor main body 39.

The piston unit 45B has a plurality of moveable flanges 131A, 131B, 131C and a piston 91C. In the fourth configuration example, the moveable flanges 131A, 131B, 131C are arranged at three equidistantly spaced places. However, the number of the equidistantly spaced places is not limited thereto.

The moveable flange 131A (also the moveable flanges 131B, 131C) has an inclined surface 133 configured to sliding-contact the inclined surface 93B formed at the axial tip-side of the piston 91C and a flange part 135 extending radially outward, which are integrally formed.

The moveable flange 131A has the inclined surface 133 formed on the inner circumference-side thereof and a sliding contact part 137 extending toward the axial rear end-side, and the arbor main body 39 has a groove portion facing an outer circumferential surface of the sliding contact part 137. In the groove portion, a compression spring 141 configured to elastically urge the outer circumferential surface 138 of the sliding contact part 137 in the radially inward direction is accommodated.

According to the arbor 17D having the above-described configuration, at a state where the piston 91C shown in FIG. 20B is not applied with the axial force toward the axial rear end-side, the flange part 135 protrudes radially outward, thereby restraining the axial movement of the ball bearing 11. That is, the piston 91C is urged toward the axial tip-side by the compression spring 47, and the inclined surface 133 of the moveable flange 131A is pressed by the inclined surface 93A of the piston 91C.

Thereby, the moveable flan 31A is moved radially outward, an that the flange part 135 protrudes from the outer circumferential surface 143 of the arbor 17D configured to support an inner circumferential surface of the inner ring of the ball bearing 11. The flange parts 135 of the other moveable flanges 131B, 131C also protrude from the outer circumferential surface 143.

Figure 21:
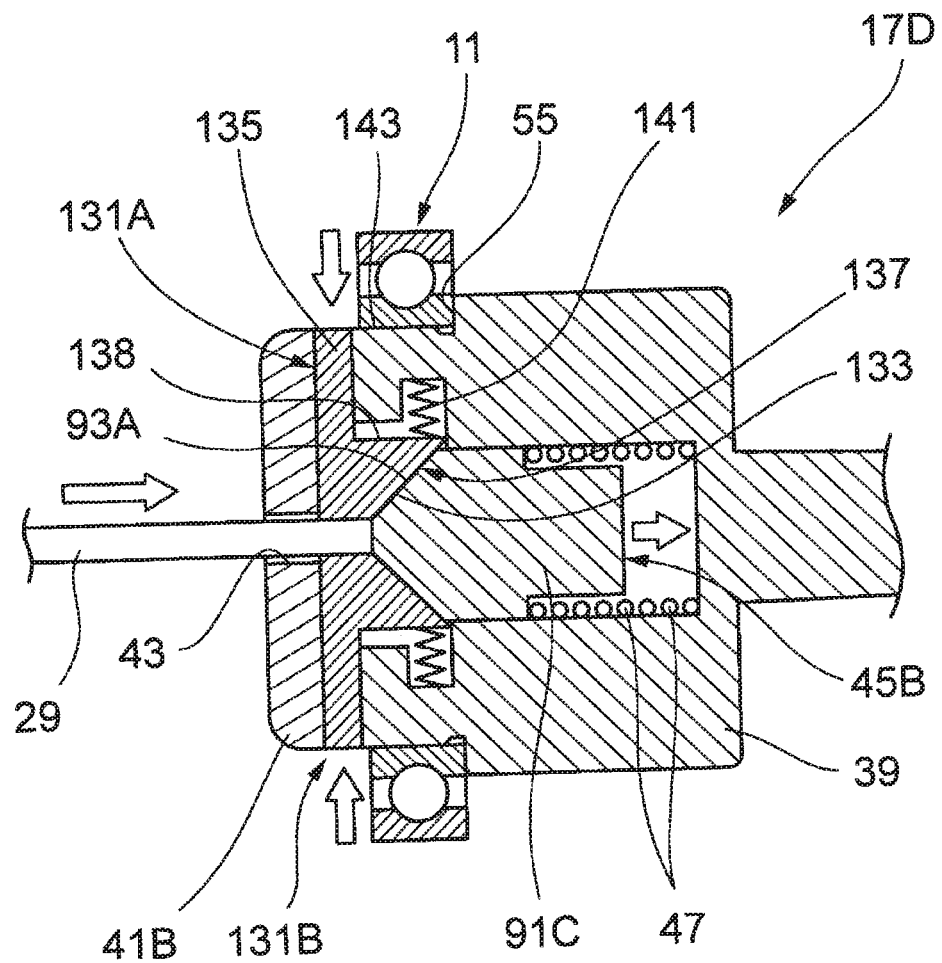
FIG. 21 is a partially sectional view of the arbor, depicting a state where the flange parts are accommodated in the arbor without protruding from the outer circumferential surface of the arbor.

FIG. 21 is a partially sectional view of depicting astute where the flange parts 135 show FIGS. 20,1 and 208 are accommodated in the arbor 17D without protruding from the outer circumferential surface 143 of the arbor 17D.

The pusher 29 is abutted to the piston 91B through the insertion hole 43 of the cover member 41B, thereby pressing the piston 91B against the elastic force of the compression spring 47. As a result, the piston 91B is moved toward the axial rear end-side along the inner wall surface of the piston accommodation part 37 of the arbor main body 39, so that the sliding contact part 137 is applied with the elastic urging force from the compression spring 141 and the moveable flange 131A is thus moved radially inward. Thereby, the flange part 135 of the moveable flange 131A is accommodated in the arbor 17D from the state where it protrudes from the outer circumferential surface 143 of the arbor 17D.

The compression spring 141 is not limited to the spring material in as much as it can urge the moveable flange 131A in the radially inward direction. For example, when an O-ring is used, it is possible to secure the air tightness and the water tightness.

<Fifth Configuration Example>

Subsequently, a fifth configuration example of the ball bearing inspection device is described.

Figure 22A:
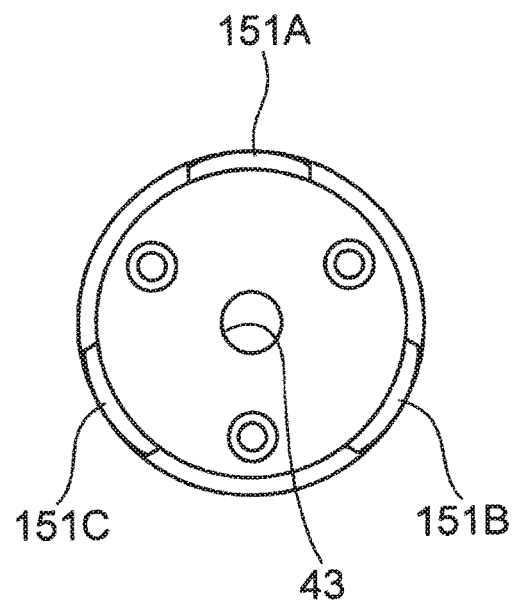
FIG. 22A is a front view of an arbor, as seen from the axial tip-side.
Figure 22B:
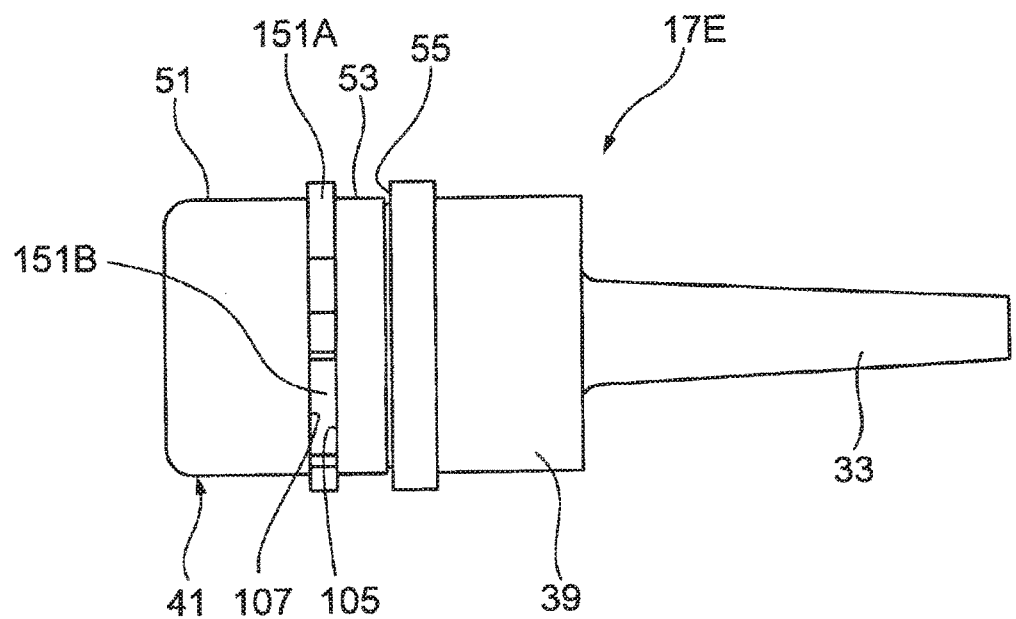
FIG. 22B is a side view of the arbor.

FIG. 22A is a front view of an arbor 17E, as seen from the axial tip-side, and FIG. 22B is a side view of the arbor 17E. The arbor main body 39 has an abutting part 55 that can contact one end surface of the ball bearing to be axially inserted. The cover member 41 is attached to one end portion of the ball bearing 11 insertion-side of the arbor main body 39. Three moveable flanges 151A, 151B, 151C are arranged between the abutting part 55 of the arbor main body 39 and the cover member 41.

The inner ring of the ball bearing (not shown) is fitted to the outer circumferential surface 53 of the arbor main body 39 closer to the cover member 41 than the abutting part 55.

The moveable flanges 151A, 151B, 151C are respectively arranged at positions at which the ball bearing is axially sandwiched from the abutting part 55 of the arbor main body 39. The moveable flanges 151A, 151B, 151C are provided at a radial height at which the moveable flanges can contact the other end surface of the ball bearing inserted into the arbor main body 39 and are lower than the outer ring of the ball bearing. The moveable flanges 151A, 151B, 151C are supported to the arbor main body 39 so that they can freely protrude and retract from and to the outer circumferential surface 53 in the radial direction.

The three moveable flanges 151A, 151B, 151C are equidistantly arranged with an interval of a central angle 120° along the circumferential direction of the arbor 17. In the fifth configuration example, the moveable flanges 151A, 151B, 151C are arranged at the three equidistantly spaced places along the circumferential direction. However, the arrangement of the moveable flanges is not limited thereto. For example, the two moveable flanges may be arranged at equidistantly spaced places or the four moveable flanges may be arranged at equidistantly spaced places. That is, the arbitrary plurality of moveable flanges may be provided and arranged at the arbitrary plurality of places along the circumferential direction of the arbor 17E.

Figure 23:
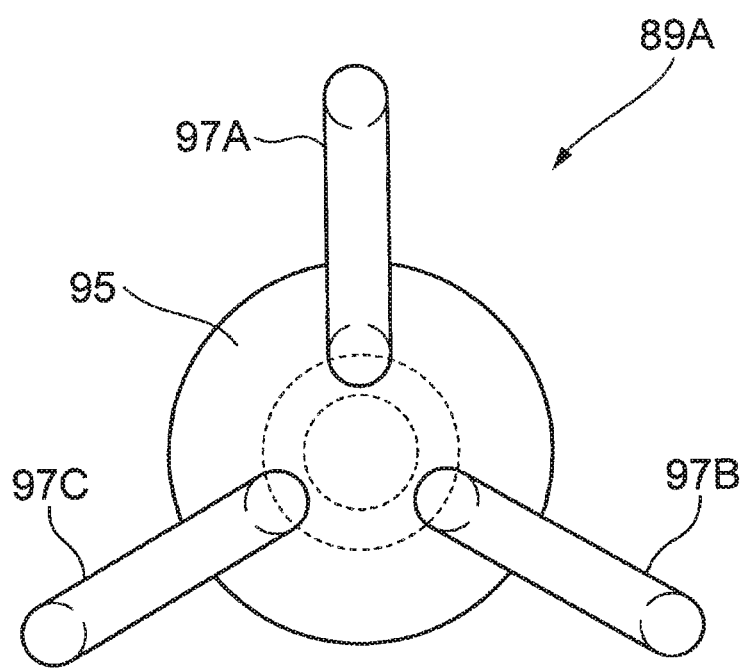
FIG. 23 is a rear view of an opening and closing member, as seen from axial rear end-side.

FIG. 23 is a rear view of an opening and closing member 89A, as seen from the axial rear end-side. The opening and closing member 89A has the base part 95 and the inclined pins 97A, 97B, 97C provided at the rear end portion of the base part 95 in a radial form and having a radial length from a shaft center gradually increasing toward the axial rear end-side. The respective inclined pins 97A, 97B, 97C are provided with being equidistantly spaced in the circumferential direction about the shaft center.

The inclined pins 97A, 97B, 97C are configured to engage with the corresponding moveable flanges 151A, 151B, 151C and to radially displace the moveable flanges 151A, 151B, 151C. That is, the inclined pin 97A is provided in correspondence to the moveable flange 151A, the inclined pin 97B is provided in correspondence to the moveable flange 151B, and the inclined pin 97C is provided in correspondence to the moveable flange 151C.

Figure 24A:
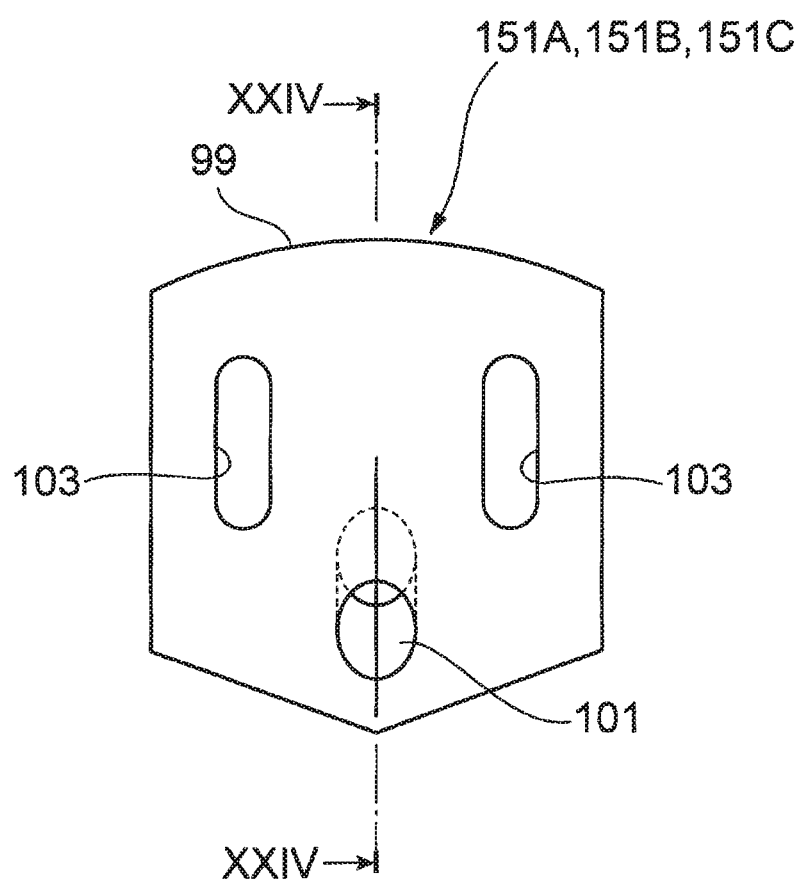
FIG. 24A is a front view of a single body of the moveable flange.
Figure 24B:
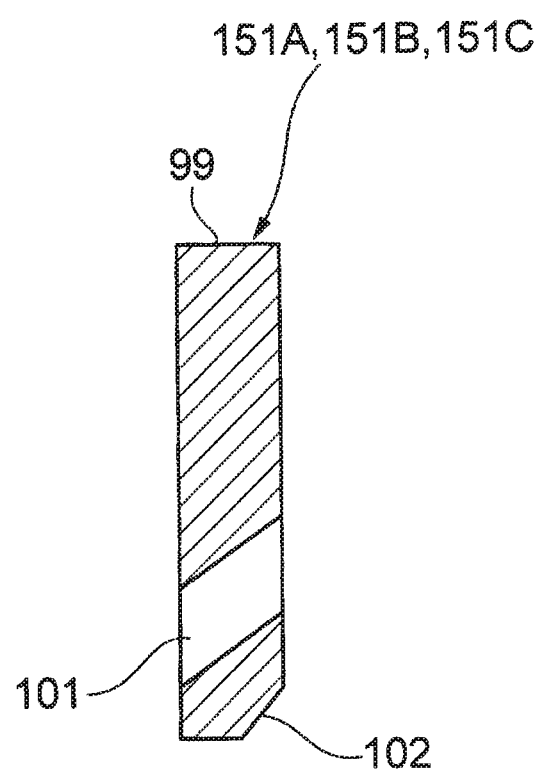
FIG. 24B is a sectional view of the moveable flange taken along a line XXIV-XXIV of FIG. 24A.

FIG. 24A is a front view of a single body of each of the moveable flanges 151A, 151B, 151C, and FIG. 24B is a sectional view of the moveable flange taken along a line XXIV-XXIV of FIG. 24A. Each of the moveable flanges 151A, 151B, 151C is formed to have a flat plate shape and has the circular arc end 99 protruding from the outer circumferential surface 53 (refer to FIG. 22B) of the arbor 17A. Each of the moveable flanges 151A, 151B, 151C has the communication hole 101 provided at the opposite side to the circular arc end 99 and inclined in a thickness direction. In the respective communication holes 101, the corresponding inclined pins 97A, 97B, 97C of the opening and closing member 89A are inserted. Also, each of the moveable flanges 151A, 151B, 151C is formed with the tip inclined surface 102 at an end portion opposite to the circular arc end 99 and more distant than the communication hole 101.

As shown in FIG. 22B, the respective moveable flanges 151A, 151B, 151C are arranged with the corresponding inclined pins 97A, 97B, 97C being inserted in the communication holes 101 between a main body-side plane part 105 and a cover member-side plane part 107 formed in parallel with each other. Thereby, the axial movement of the respective moveable flanges 151A, 151B, 151C is restrained. Also, the respective moveable flanges are supported so that they can slide radially by the movement of the corresponding inclined pins 97A, 97B, 97C.

In the below, the support structure by which the moveable flanges 151A, 151B, 151C are supported so as to freely protrude and retract in the radial direction from and to the outer circumferential surface 53 of the arbor main body 39 is described in more detail.

Figure 25:
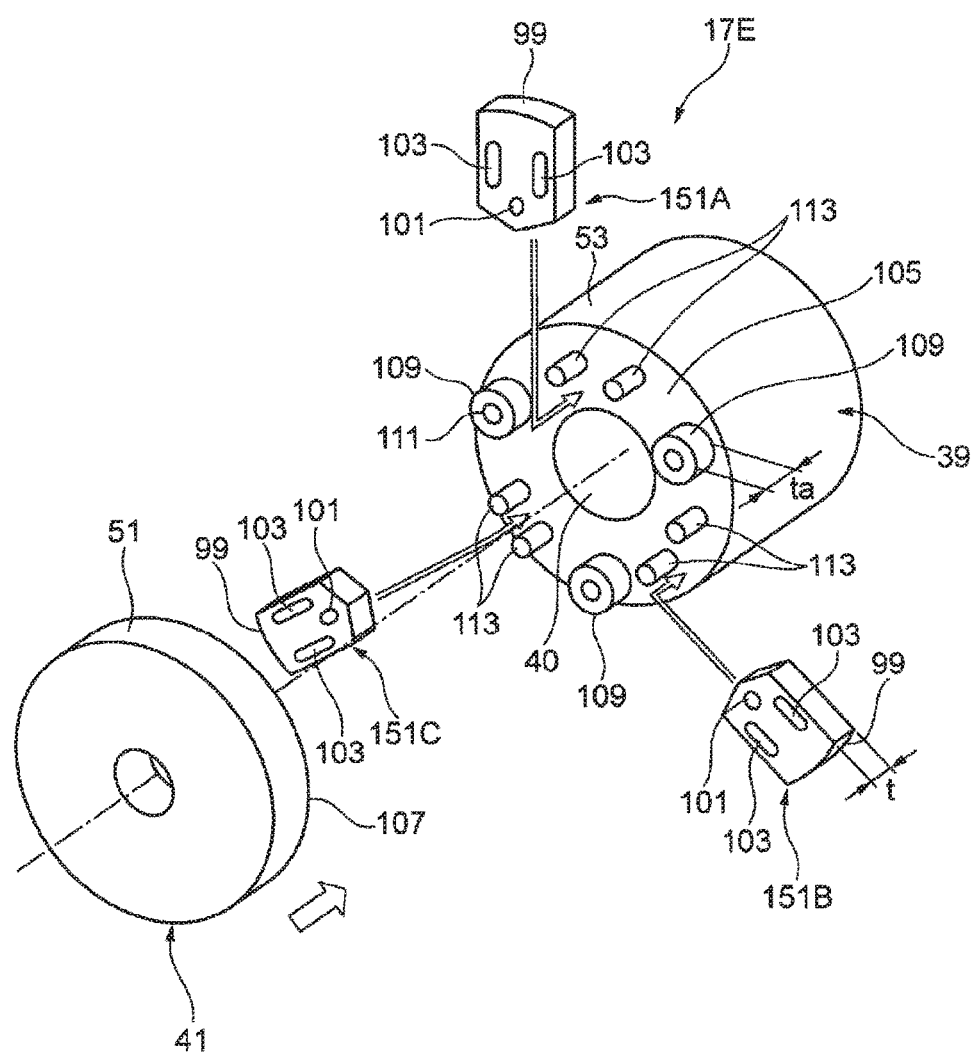
FIG. 25 is an exploded perspective view of pictorially depicting a support structure of the moveable flanges.

FIG. 25 is an exploded perspective view of pictorially depicting the support structure of the moveable flanges 151A, 151B, 151C. The moveable flanges 151A, 151B, 151C are arranged between the main body-side plane part 105 formed at one end portion of the arbor main body 39 facing toward the cover member 41 and the cover member-side plane part 107 formed at an end portion of the cover member 41 facing toward the arbor main body 39.

A plurality of spacer members 109 formed separately from the arbor main body 39 and the cover member 41 is arranged between the main body-side plane part 105 and the cover member-side plane part 107. The spacer member 109 is a cylindrical member having a through-hole 111 formed at a central part thereof. In the shown example, the respective spacer members 109 are arranged at three equidistantly spaced places along the circumferential direction.

Each spacer member 109 has a thickness ta slightly larger than a plate thickness t of each of the moveable flanges 151A, 151B, 151C. The main body-side plane part 105 and the cover member-side plane part 107 are respectively closely contacted to axial end surfaces of the respective spacer members 109, so that a gap size between the main body-side plane part 105 and the cover member-side plane part 107 is set to 'ta'. The grinding processing or polishing processing is performed for both axial end surfaces of each spacer member 109, so that the thickness ta is strictly managed.

The spacer members 109 are arranged in a balanced manner at three places at which they do not interfere with the three moveable flanges 151A, 151B, 151C and can stably maintain the gap between the main body-side plane part 105 and the cover member-side plane part 107.

Figure 26:
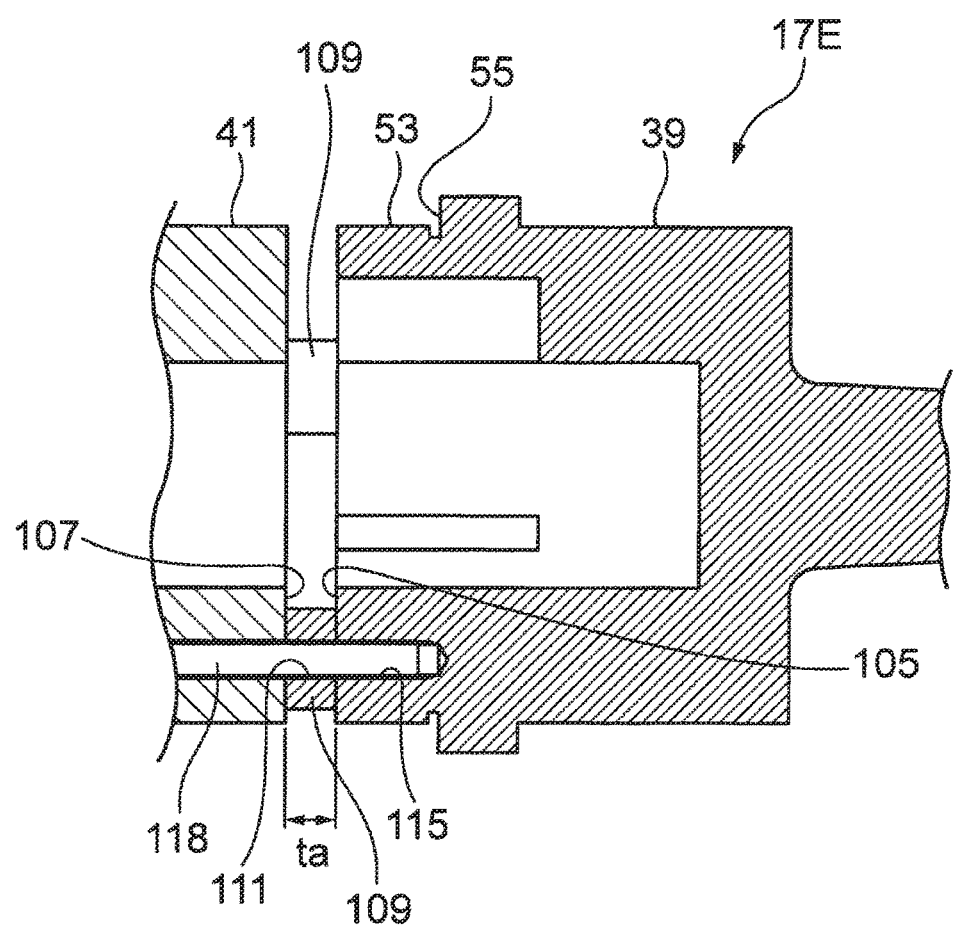
FIG. 26 is a side sectional view of the arbor, depicting a relation among an arbor main body, a cover member and a spacer member.

FIG. 26 is a side sectional view of the arbor 17E, depicting a relation among the arbor main body 39, the cover member 41 and the spacer member 109. The cover member 41 is attached to the arbor main body 39 by bolts 118. A tip portion of the bolt 118 passes through the through-hole 111 of the spacer member 109 and is screwed to a screw hole 115 formed in the main body-side plane part 105. Thereby, an axial size between the cover member-side plane part 107 of the cover member 41 and the main body-side plane part 105 of the arbor main body 39 is set to the thickness ta of the spacer member 109.

Also, as shown in FIG. 25, the moveable flanges 151A, 151B, 151C are respectively formed with a pair of guide holes 103 for guiding a radial slide operation. The pair of guide holes 103 is long holes parallel with each other and formed along the radial direction in which the moveable flanges 151A, 151B, 151C protrude and retract.

The main body-side plane part 105 of the arbor main body 39 is provided with three sets of a pair of guide pins 113 to be inserted into the pair of guide holes 103 so as to guide the moveable flanges 151A, 151B, 151C in the protruding and retracting direction. An axial height of the guide pin 113 is set smaller than the thickness ta of the spacer member 109.

The pair of guide pins 113 is respectively fitted to the guide holes 103 of each of the moveable flanges 151A, 151B, 151C and is configured to slide in the guide holes 103, thereby guiding the moveable flanges 151A, 151B, 151C along the radial direction of the arbor 17. In the meantime, the guide pin 113 may be provided upright on the cover member-side plane part 107 of the cover member 41.

An axial size of the space in which the moveable flanges 151A, 151B, 151C are accommodated between the arbor main body 39 and the cover member 41 is set with high precision by the spacer member 109. Thereby, when the moveable flanges 151A, 151B, 151C protrude from the outer circumferential surface of the arbor 17 51, 53, an axial swing amount is suppressed small.

The swing amount of the moveable flange is described in more detail.

For example, if the axial swing amounts (play amounts of the three moveable flanges 151A, 151B, 151C) are highly unequal, when the ball bearing to be inserted into the outer circumferential surface 53 is preloaded, the inner ring may be inclined relative to the rotary shaft. The inclination of the inner ring 15 generates a noise component affecting the vibration measurement, thereby lowering the precision of the vibration measurement. For this reason, it is necessary to prevent the inner ring 15 from being inclined by reducing the axial swing amounts of the moveable flanges 151A, 151B, 151C.

Figure 27:
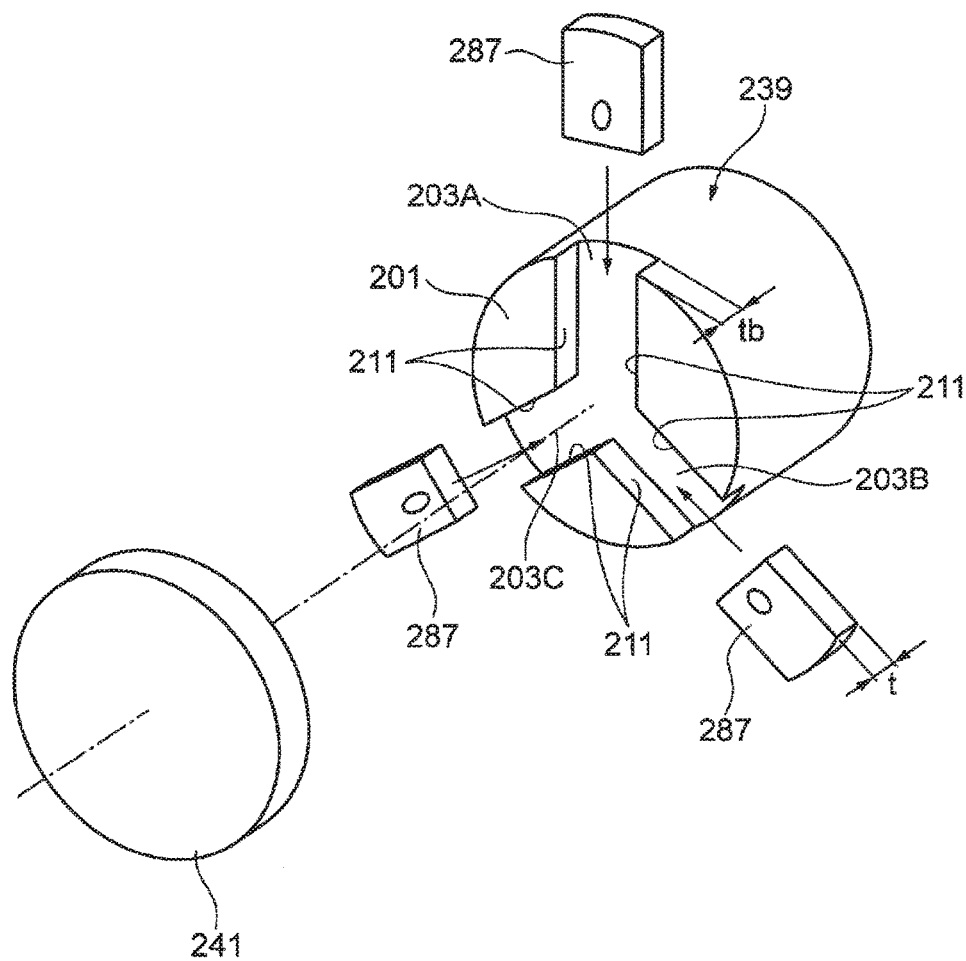
FIG. 27 is an exploded perspective view of depicting a reference example of the support structure of the moveable flange.

Herein, a reference example where the moveable flanges are guided in grooves formed on an end surface of the arbor main body is described. FIG. 27 depicts a support structure of the moveable flanges, as a reference example.

An end surface 201 of an arbor main body 239 is formed with three grooves 203A, 203B, 203C along a radial direction with a circumferential interval of 120°. In the grooves 203A, 203B, 203C, moveable flanges 287 are respectively inserted. At a state where the respective moveable flanges 287 are accommodated in the grooves 203A, 20313, 203C, a cover member 241 is attached to the end surface 201 of the arbor main body 239.

Thereby, the moveable flanges 287 are supported to the arbor main body 239 so that they can freely slide in the radial direction. In this case, an axial width of a space in which the moveable flanges 287 are to be accommodated is set by a groove depth tb of the grooves 203A, 203B, 203C and a thickness t of the moveable flanges 287. Also, the moveable flanges 287 are circumferentially positioned and radially guided by groove side surfaces 211 of the grooves 203A, 203B, 203C.

If the three moveable flanges 287 are simultaneously grinded by a flat surface grinding machine, it is possible to match the thickness t of each of the three moveable flanges 287 with high precision. However, it is necessary to separately process the three grooves 203A, 203B, 203C for accommodating therein the moveable flanges 287. That is, when processing groove bottoms of the three grooves 203A, 203B, 203C with the flat surface grinding machine, at least 3-pass is required. Therefore, it is difficult to match the groove depth tb of each of the grooves 203A, 203B, 203C with high precision.

If the groove depths tb of each of the grooves 203A, 203B, 203C are not matched each other with high precision, axial gaps between the moveable flanges 287 and the grooves 203A, 203B, 203C become unequal. The moveable flange 287 can be axially inclined by the axial gap, so that the axial swing amount of the moveable flange 287 increases. As a result, when the ball bearing is applied with the preload, the inner ring of the ball bearing is inclined relative to the rotary shaft, so that a noise component affecting the vibration measurement is generated.

Like this, in the reference example of FIG. 27, the grooves 203A, 203B, 203C having unequal groove depths tb determine the axial width of a moveable space of the moveable flanges 287. On the other hand, in the inspection device having the above-described configuration shown in FIG. 25, the thickness ta of the spacer members 109 sandwiched between the main body-side plane part 105 of the arbor main body 39 and the cover member-side plane part 107 of the cover member 41 determines the axial width of the moveable space of the moveable flanges 151A, 151B, 151C.

Also, in the reference example of FIG. 27, the radial sliding of the moveable flanges 287 is guided by the grooves 203A, 203B, 203C. On the other hand, as shown in FIG. 25, according to the inspection device having the above-described configuration, the radial sliding of the moveable flanges 151A, 151B, 151C is guided by the guide pins 113 and the guide holes 103.

In the fifth configuration, the main body-side plane part 105 of the arbor main body 39 is a simple plane having no groove or the like. Therefore, the perpendicularity and flatness relative to the rotary shaft of the arbor 17E are obtained with high precision by the processing using the flat surface grinding machine or the like. Also, for the cover member-side plane part 107 of the cover member 41, the perpendicularity and flatness relative to the rotary shaft of the arbor 17E are obtained with high precision.

The three moveable flanges 151A, 151B, 151C can be processed at the same time by the flat surface grinding machine or the like, and the three spacer members 109 can also be processed at the same time. For this reason, it is possible to make the thickness t of each of the moveable flanges 151A, 151B, 151C and the axial length of each of the spacer members 109 equal with high precision, respectively.

As described above, the simultaneous processing can be performed, so that it is possible to improve the mutual size precision to 1 μm or smaller and to thereby remove the individual difference.

The axial size of the moveable space of the moveable flanges 151A, 151B, 151C is determined with high precision by the main body-side plane part 105 and the cover member-side plane part 107, the spacer members 109 configured to determine the interval therebetween and the moveable flanges 151A, 151B, 151C. As a result, it is possible to reduce the axial heights of the moveable flanges 151A, 151B, 151C, as designed, so that it is possible to suppress the inclination of the inner ring when the ball bearing is preloaded. Therefore, the noise component affecting the vibration inspection is reduced, so that it is possible to perform the measurement with high precision.

Also, it is possible to radially slide the moveable flanges 151A, 151B, 151C smoothly and precisely by the guide pins 113 and the guide holes 103, which can be processed with high precision.

Also, the arbor 17E can be manufactured simply by the flat surface grinding or flat surface polishing without the groove processing, so that it is possible to save the processing cost. Further, if the moveable flanges 151A, 151B, 151C are contacted to the ball bearing and are thus worn, it is possible to reuse the arbor 17E by again grinding or polishing the moveable flanges 151A, 151B, 151C and the spacer members 109. Thereby, it is possible to save the running cost, too.

In the below, the operation of protruding and retracting the moveable flange 151A, 151B, 151C from and to the outer circumferential surface 53 of the arbor 17E by the above-described configuration of the arbor 17E is described.

Figure 28A:
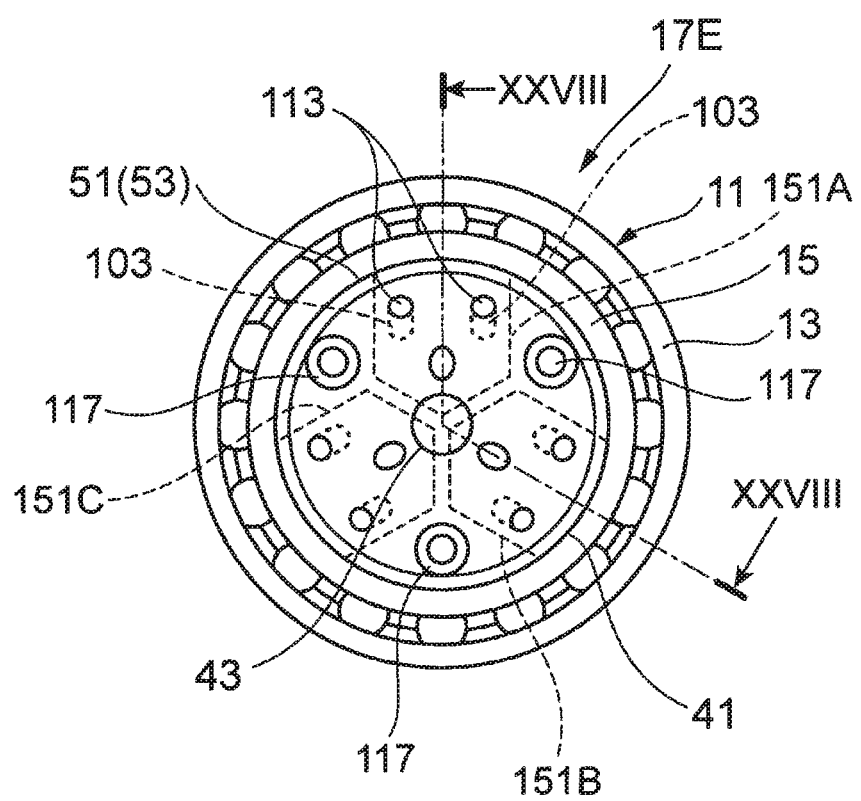
FIG. 28A is a front view of the arbor.
Figure 28B:
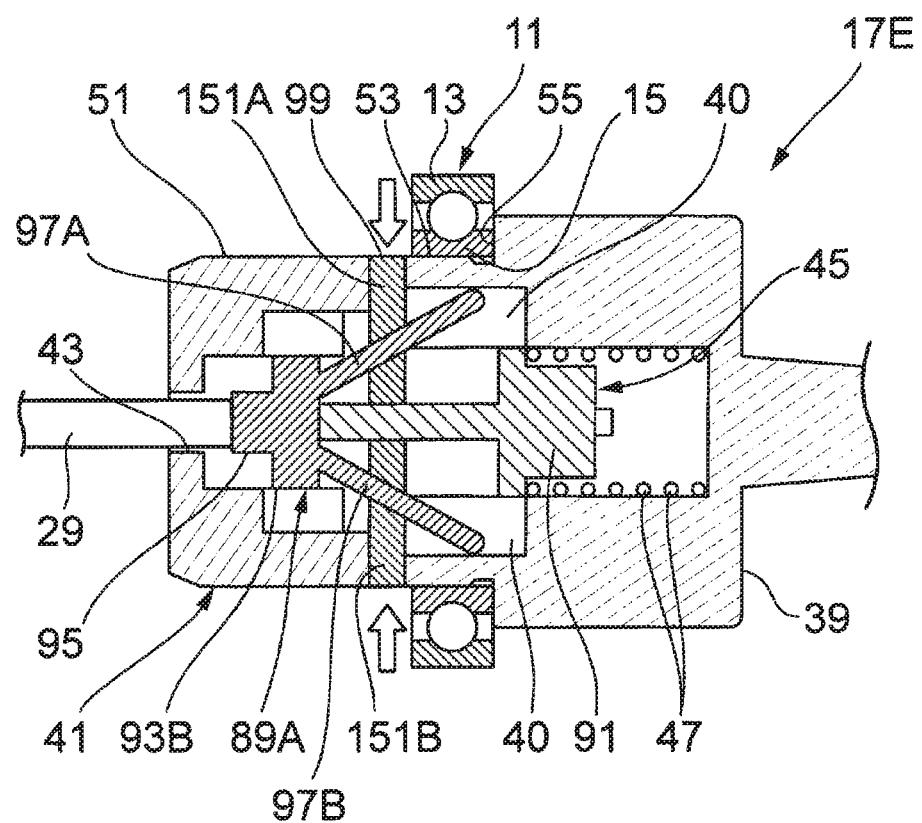
FIG. 28B is a partially sectional view of the arbor taken along a line XXVIII-XXVIII of FIG. 28A.

FIG. 28A is a front view of the arbor 17 with the moveable flanges 151A, 151B, 151C being accommodated therein and FIG. 28B is a partially sectional view of the arbor 17 taken along a line XXVIII-XXVIII of FIG. 28A.

First, the pusher 29 of the loading unit is moved toward the arbor 17E, and the piston unit 45 is moved toward the axial rear end-side. Thereby, the moveable flanges 151A, 151B, 151C are accommodated in the arbor 17E from the radially protruding state from the outer circumferential surface 53 of the arbor 17E (and the outer circumferential surface 51 of the cover member 41).

That is, when the pusher 29 pushes the base part 95 of the opening and closing member 89A toward the axial rear end-side, the opening and closing member 89A is axially pressed toward the rear end-side. Thereby, the opening and closing member 89A pushes and contracts the compression spring 47 via the piston 91A, and moves toward the rear end-side together with the piston 91A.

At this time, the inclined pins 97A, 97B, 97C (refer to FIG. 23, too) of the opening and closing member 89A are axially moved with being restrained from rotating by the three grooves 40 formed in the radial shape at the tip-side of the arbor main body 39 in correspondence to the inclined pins 97A, 97B, 97C.

The engaging positions between the inclined pins 97A, 97B, 97C and the communication holes 101 of the moveable flanges 151A, 151B, 151C having the respective inclined pins 97A, 97B, 97C inserted in the communication holes 101 are changed in the radially inward direction as the opening and closing member 894 is axially moved. As a result, as shown in FIGS. 28A and 28B, the respective moveable flanges 151A, 151B, 151C are moved radially inward, so that the protruding state of the circular arc ends 99 of the respective moveable flanges 151A, 151B, 151C from the outer circumferential surface of the arbor 17 51 (and the outer circumferential surface 53 the cover member 41) is canceled.

Figure 29A:
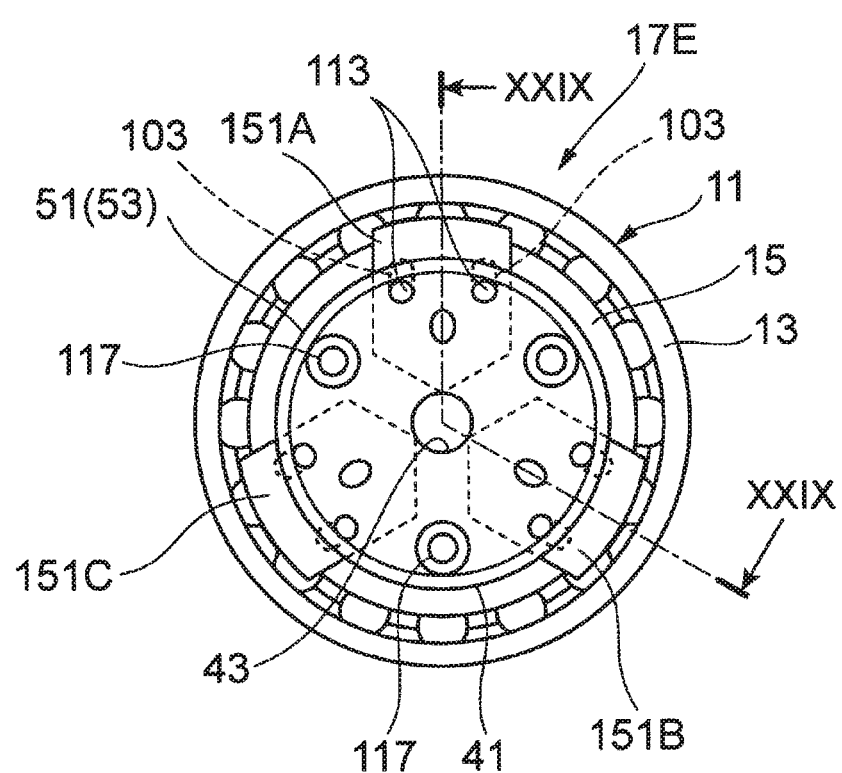
FIG. 29A is a front view of the arbor.
Figure 29B:
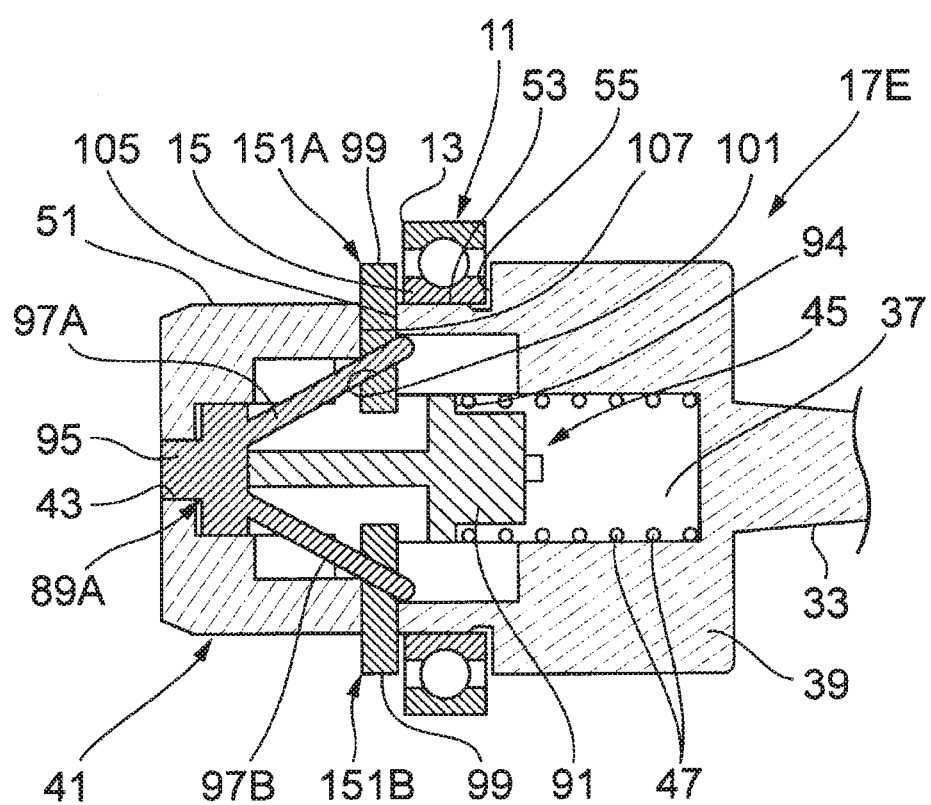
FIG. 29B is a partially sectional view of the arbor taken along a line XXIX-XXIX of FIG. 29A.

FIG. 29A is a front view of the arbor 17E at the protruding state of the moveable flanges 151A, 151B, 151C, and FIG. 29B is a partially sectional view of the arbor 17E taken along a line XXIX-XXIX of FIG. 29A. When the pusher of the loading unit is spaced from the arbor 17E, the piston 91 and the opening and closing member 89A are urged toward the axial tip-side by the elastic restoring force of the compression spring 47. Thereby, like the second configuration example, the respective inclined surfaces 93E of the piston 91A are contacted to the tip inclined surfaces 102 of the corresponding moveable flanges 151A, 151B, 151C and are pushed radially outward. Thereby, the moveable flange 151A, 151B, 151C protrude from the outer circumferential surface 53 of the arbor 17 (and the outer circumferential surface 51 of the cover member 41).

When the moveable flanges 151A, 151B, 151C move radially, the guide pins 113 slide in the guide holes 103 of the moveable flanges 151A, 151B, 151C. Thereby, the moveable flanges 151A, 151B, 151C can smoothly move without the rattling.

The present invention is not limited to the above illustrative embodiment, and changes and applications made by one skilled in the art on the basis of combinations of the respective configurations of the illustrative embodiment, the descriptions of the specification and the well-known technology are also anticipated by the present invention and are included within the range to be protected.

The subject application is based on a Japanese Patent Application No. 2014-104335 filed on May 20, 2014 and a Japanese Patent Application No. 2015-69845 filed on Mar. 30, 2015, which are herein incorporated by reference.

DESCRIPTION OF REFERENCE NUMERALS AND SIGNS

11: ball bearing
13: outer ring
15: inner ring
17, 17A, 17B, 17C, 17D, 17E: arbor
19: rotary drive unit
21: first pressing unit
23: second pressing unit
25: vibration detection unit
27: loading unit
29: pusher (piston operation part)
41: cover member
45, 45A, 45B: piston unit
51: outer circumferential surface
53: outer circumferential surface
55: abutting part
61: tip-side pressing ring
63: base end-side pressing ring
87, 87A, 87B, 87C, 87A1, 88A, 88B, 88C, 88D, 88A1, 118A, 118B, 118C, 118D, 151A, 151B, 151C: moveable flange
89, 116: opening and closing member
91, 91A, 91B: piston
93A, 93B, 93C, 93D: inclined surface
97A, 97B, 97C, 97D: inclined pin
100: ball bearing inspection device
101: communication hole
102: tip inclined surface
103: guide hole
105: main body-side plane part
107: cover member-side plane part
109: spacer member
113: guide pin
Pa: pressing force
Pb: pressing force

The invention claimed is:

1. A ball bearing inspection device configured to detect vibration to be generated from a ball bearing by relatively rotating an outer ring and an inner ring of the ball bearing, the ball bearing inspection device comprising:
    an arbor configured to support the inner ring of the ball bearing on an outer circumferential surface of the arbor;
    a rotary drive unit configured to rotationally drive the arbor;
    a first pressing unit configured to apply a preload to the ball bearing by pressing the outer ring of the ball bearing supported on the arbor in an axial direction;
    a second pressing unit configured to apply a preload to the ball bearing by pressing the outer ring in an opposite direction to the pressing direction of the first pressing unit; and
    a vibration detection unit configured to detect the vibration from the ball bearing, wherein:
    the arbor comprises:
        an abutting part protruding radially outward from the outer circumferential surface of the arbor;
        at least one moveable flange arranged apart from the abutting part at least by a width of the inner ring; and
        a flange drive mechanism configured to switch the moveable flange between a first state where the moveable flange protrudes from the outer circumferential surface and a second state where the moveable flange is accommodated in the arbor; and
    the ball bearing inspection device further comprises a drive force supply unit configured to apply a drive force to the flange drive mechanism for switching the flange drive mechanism to the first state or the second state.

2. The ball bearing inspection device according to claim 1, wherein:
    the flange drive mechanism comprises a piston unit supported to be freely moveable in the axial direction in the arbor;
    at least one of the piston unit and the moveable flange has an inclined surface inclined relative to the axial direction; and
    the piston unit and the moveable flange are configured to slide each other on the inclined surface, so that axial movement of the piston unit is converted into radial movement of the moveable flange.

3. The ball bearing inspection device according to claim 1, further comprising
    a loading unit configured to supply the ball bearing to the arbor, wherein
    the drive force supply unit is mounted to the loading unit.

4. The ball bearing inspection device according to claim 1, further comprising
    a calculation unit configured to calculate an evaluation value for evaluating the ball bearing, based on a vibration detection result by the vibration detection unit.

5. The ball bearing inspection device according to claim 1, wherein:
    the arbor comprises:
        an arbor main body having the abutting part formed thereto; and
        a cover member attached to one end portion of a ball bearing insertion-side of the arbor main body; and the moveable flange is a flat plate-shaped member arranged between a main body-side plane part formed at the one end portion of the arbor main body and a cover member-side plane part formed in parallel with the main body-side plane part with facing the main body-side plane part of the cover member.

6. The ball bearing inspection device according to claim 5, wherein
a spacer member having a thickness larger than a plate thickness of the moveable flange is arranged between the main body-side plane part and the cover member-side plane part.

7. The ball bearing inspection device according to claim 5, wherein:
the moveable flange has a pair of guide holes parallel with each other formed along the radial direction; and
at least one of the arbor main body and the cover member has a pair of guide pins to be fitted to the guide holes.

8. A ball bearing inspection method using the ball bearing inspection device according to claim 1, the method comprising:
inserting an inner ring of a ball bearing to be inspected into the arbor at the second state of the moveable flange and supporting the ball bearing at a position at which the inner ring is contacted to the abutting part;
protruding the moveable flange from the outer circumferential surface by the flange drive mechanism;
detecting vibration of the ball bearing by applying a preload to the ball bearing by one of the first pressing unit and the second pressing unit at a state where the inner ring is rotationally driven; and
detecting vibration of the ball bearing by applying a preload to the ball bearing by the other of the first pressing unit and the second pressing unit at the state where the inner ring is rotationally driven.

9. The ball bearing inspection method according to claim 8, further comprising
calculating an evaluation value for evaluating the ball bearing on the basis of a vibration detection result of the ball bearing.

* * * * *